US011509383B2

(12) United States Patent
Xu et al.

(10) Patent No.: US 11,509,383 B2
(45) Date of Patent: Nov. 22, 2022

(54) DEFAULT PHYSICAL DOWNLINK SHARED CHANNEL DOWNLINK BEAM DETERMINATION WITH SELF-INTERFERENCE

(71) Applicant: QUALCOMM Incorporated, San Diego, CA (US)

(72) Inventors: Huilin Xu, San Diego, CA (US); Alexandros Manolakos, San Diego, CA (US); Weimin Duan, San Diego, CA (US); June Namgoong, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 47 days.

(21) Appl. No.: 16/877,005

(22) Filed: May 18, 2020

(65) Prior Publication Data
US 2021/0194564 A1 Jun. 24, 2021

(30) Foreign Application Priority Data
Dec. 23, 2019 (GR) ............................ 20190100575

(51) Int. Cl.
H04W 72/04 (2009.01)
H04W 72/12 (2009.01)
H04W 72/14 (2009.01)
H04B 7/08 (2006.01)
H04L 5/14 (2006.01)
H04L 25/02 (2006.01)
H04W 16/28 (2009.01)
H04W 76/11 (2018.01)
H04W 24/08 (2009.01)
H04L 5/00 (2006.01)

(52) U.S. Cl.
CPC ........... H04B 7/088 (2013.01); H04L 5/0051 (2013.01); H04L 5/1461 (2013.01); H04L 25/0226 (2013.01); H04W 16/28 (2013.01); H04W 24/08 (2013.01); H04W 72/046 (2013.01); H04W 72/1273 (2013.01); H04W 76/11 (2018.02)

(58) Field of Classification Search
None
See application file for complete search history.

(56) References Cited

U.S. PATENT DOCUMENTS 10,624,156 B2 * 4/2020 Xiong ................. H04W 72/042
2015/0326269 A1 11/2015 Ko et al.
2017/0019238 A1 1/2017 Sharma et al.
(Continued)

OTHER PUBLICATIONS

International Search Report and Written Opinion—PCT/US2020/070815—ISA/EPO—dated Feb. 4, 2021.

Primary Examiner — Sai Aung
(74) Attorney, Agent, or Firm — Harrity & Harrity, LLP

(57) ABSTRACT

Various aspects of the present disclosure generally relate to wireless communication. In some aspects, a user equipment (UE) may receive scheduling information that schedules a physical downlink shared channel (PDSCH) communication for the UE; and select a downlink beam for reception of the PDSCH communication from a set of usable downlink beams associated with an uplink beam to be used by the UE for uplink transmission in one or more symbols in which the PDSCH communication is scheduled. Numerous other aspects are provided.

30 Claims, 13 Drawing Sheets

(56) References Cited

U.S. PATENT DOCUMENTS

| | | |
|---|---|---|
| 2017/0223695 A1* | 8/2017 | Kwak ............... H04W 56/0075 |
| 2019/0140811 A1 | 5/2019 | Abedini et al. |
| 2020/0177323 A1* | 6/2020 | Fakoorian ............. H04L 5/0007 |
| 2020/0288479 A1* | 9/2020 | Xi ........................... H04B 7/02 |
| 2021/0067295 A1* | 3/2021 | Sun ....................... H04L 27/156 |
| 2021/0119688 A1* | 4/2021 | Enescu ................ H04B 7/0695 |
| 2022/0029761 A1* | 1/2022 | Su ........................ H04L 5/1461 |

* cited by examiner

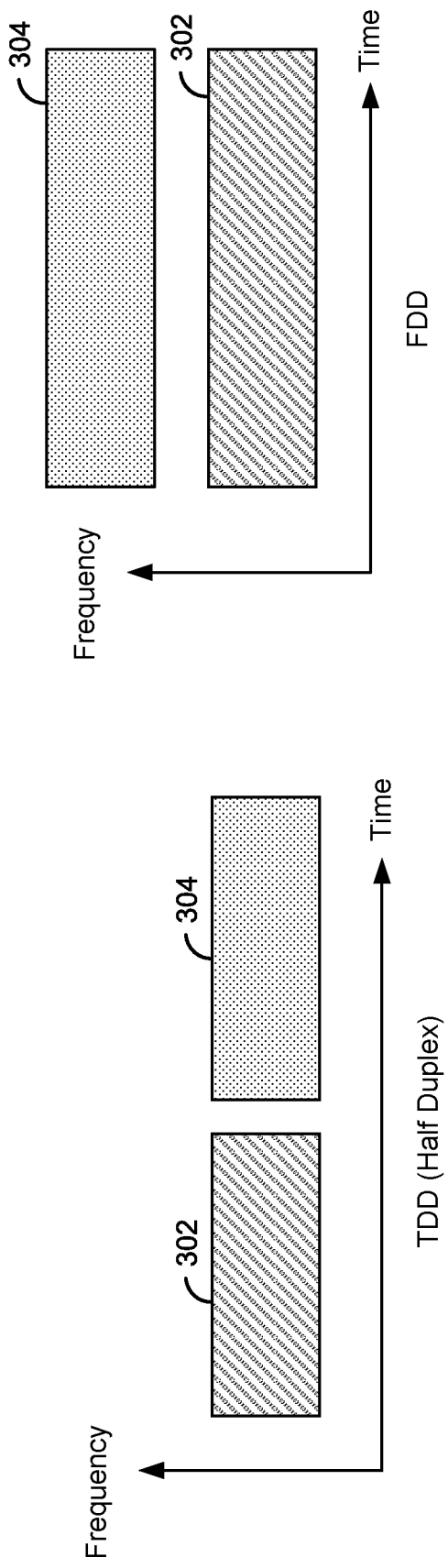
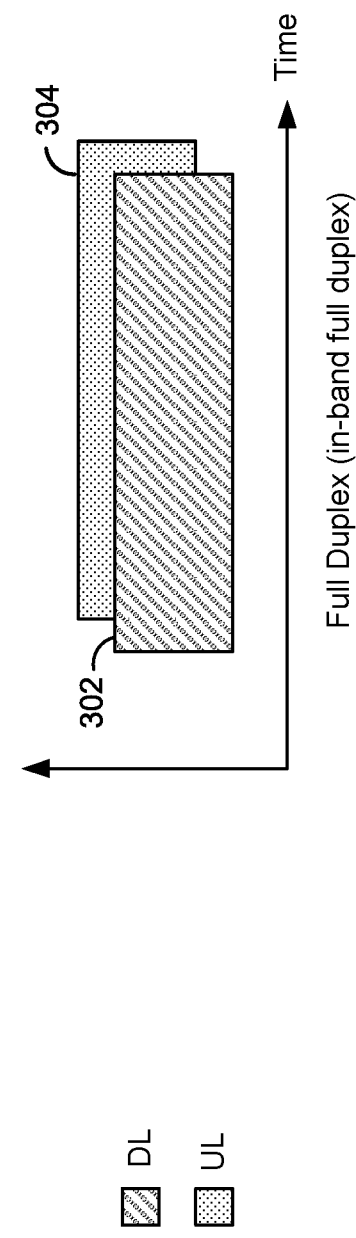
FIG. 3A
FIG. 3B
FIG. 3C

DEFAULT PHYSICAL DOWNLINK SHARED CHANNEL DOWNLINK BEAM DETERMINATION WITH SELF-INTERFERENCE

CROSS-REFERENCE TO RELATED APPLICATION

This Patent Application claims priority to Greece Patent Application No. 20190100575, filed on Dec. 23, 2019, entitled "DEFAULT PHYSICAL DOWNLINK SHARED CHANNEL DOWNLINK BEAM DETERMINATION WITH SELF-INTERFERENCE," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for default physical downlink shared channel downlink beam determination with self-interference.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving scheduling information that schedules a physical downlink shared channel (PDSCH) communication for the UE; and selecting a downlink beam for reception of the PDSCH communication from a set of usable downlink beams associated with an uplink beam to be used by the UE for uplink transmission in one or more symbols in which the PDSCH communication is scheduled.

In some aspects, a method of wireless communication, performed by a base station, may include transmitting scheduling information that schedules a PDSCH communication for a UE; and selecting a downlink beam for transmission of the PDSCH communication from a set of usable downlink beams associated with an uplink beam to be used by the UE for uplink transmission in one or more symbols in which the PDSCH communication is scheduled.

In some aspects, a UE for wireless communication may include memory and one or more processors operatively coupled to the memory. The memory and the one or more processors may be configured to receive scheduling information that schedules a PDSCH communication for the UE; and select a downlink beam for reception of the PDSCH communication from a set of usable downlink beams associated with an uplink beam to be used by the UE for uplink transmission in one or more symbols in which the PDSCH communication is scheduled.

In some aspects, a base station for wireless communication may include memory and one or more processors operatively coupled to the memory. The memory and the one or more processors may be configured to transmit scheduling information that schedules a PDSCH communication for a UE; and select a downlink beam for transmission of the PDSCH communication from a set of usable downlink beams associated with an uplink beam to be used by the UE for uplink transmission in one or more symbols in which the PDSCH communication is scheduled.

In some aspects, a non-transitory computer-readable medium may store one or more instructions for wireless communication. The one or more instructions, when executed by one or more processors of a UE, may cause the one or more processors to: receive scheduling information that schedules a PDSCH communication for the UE; and select a downlink beam for reception of the PDSCH communication from a set of usable downlink beams associated with an uplink beam to be used by the UE for uplink transmission in one or more symbols in which the PDSCH communication is scheduled.

In some aspects, a non-transitory computer-readable medium may store one or more instructions for wireless communication. The one or more instructions, when executed by one or more processors of a base station, may cause the one or more processors to: transmit scheduling information that schedules a PDSCH communication for a UE; and select a downlink beam for transmission of the PDSCH communication from a set of usable downlink beams associated with an uplink beam to be used by the UE for uplink transmission in one or more symbols in which the PDSCH communication is scheduled.

In some aspects, an apparatus for wireless communication may include means for receiving scheduling information that schedules a PDSCH communication for the apparatus; and means for selecting a downlink beam for reception of the PDSCH communication from a set of usable downlink beams associated with an uplink beam to be used by the apparatus for uplink transmission in one or more symbols in which the PDSCH communication is scheduled.

In some aspects, an apparatus for wireless communication may include means for transmitting scheduling information that schedules a PDSCH communication for a UE; and means for selecting a downlink beam for transmission of the PDSCH communication from a set of usable downlink beams associated with an uplink beam to be used by the UE for uplink transmission in one or more symbols in which the PDSCH communication is scheduled.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A-3C are diagrams illustrating various duplexing modes in a radio access network, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
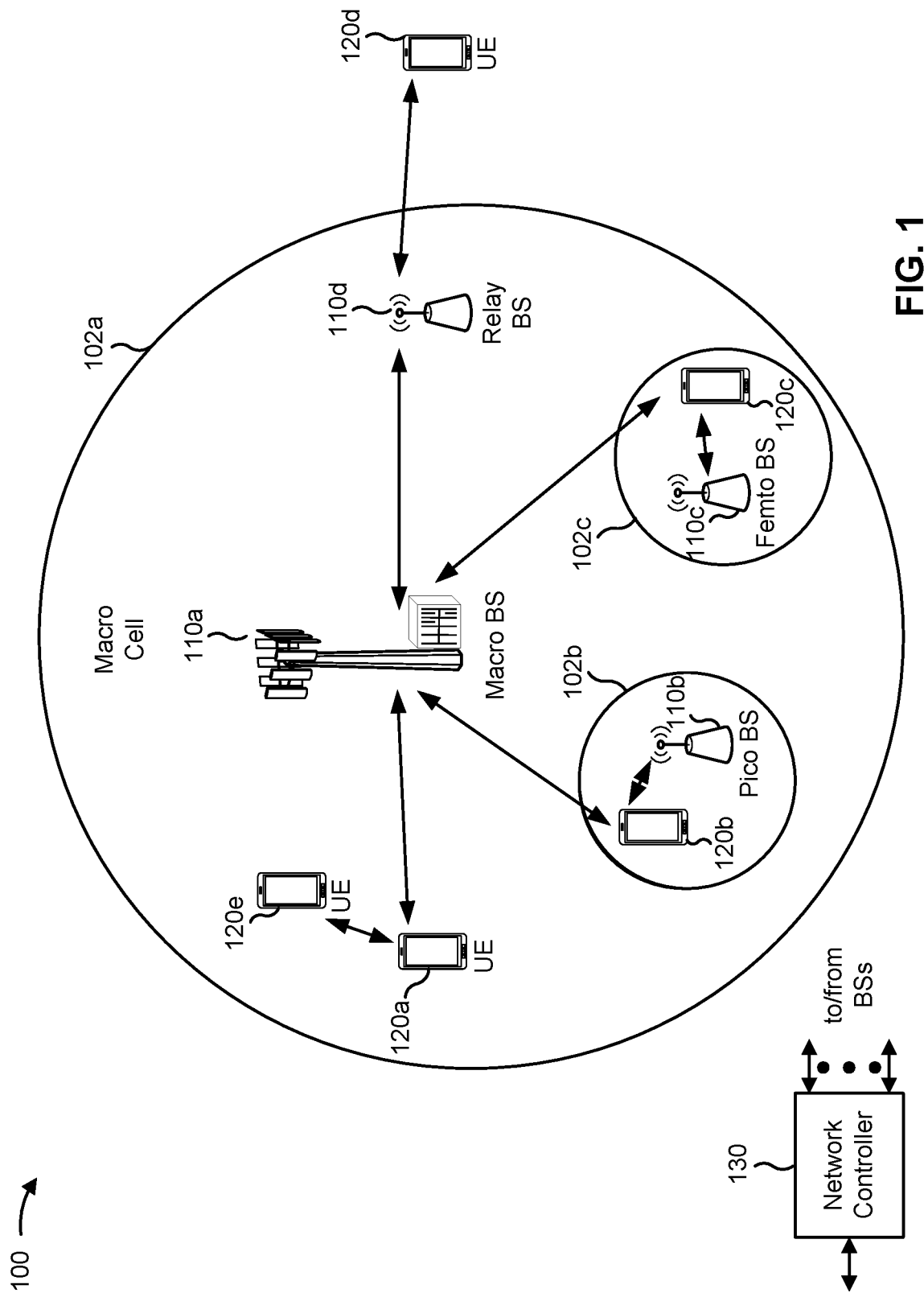
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
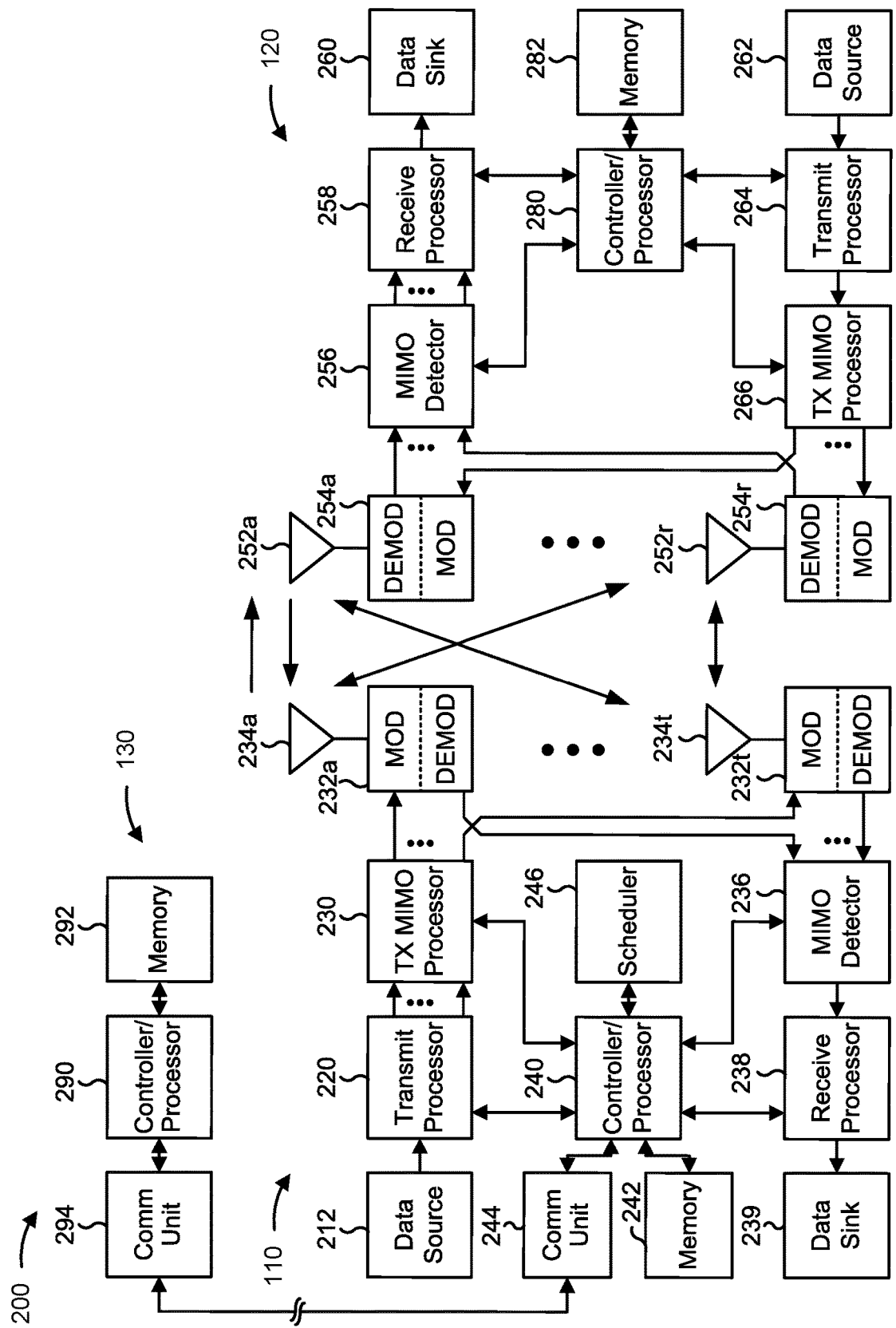
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with default physical downlink shared channel (PDSCH) downlink beam determination with self-interference, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 800 of FIG. 8, process 900 of FIG. 9, and/or other processes as described herein. A scheduler 246 may schedule UEs for data transmission on the downlink and/or uplink.

In some aspects, UE 120 may include means for receiving scheduling information that schedules a PDSCH communication for the UE 120; means for selecting a downlink beam for reception of the PDSCH communication from a set of usable downlink beams associated with an uplink beam to be used by the UE for uplink transmission in one or more symbols in which the PDSCH communication is scheduled; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting scheduling information that schedules a PDSCH communication for the UE 120; means for selecting a downlink beam for transmission of the PDSCH communication from a set of usable downlink beams associated with an uplink beam to be used by the UE for uplink transmission in one or more symbols in which the PDSCH communication is scheduled; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

FIGS. 3A-3C are diagrams illustrating various duplexing modes in a radio access network, in accordance with various aspects of the present disclosure. FIG. 3A depicts a time division duplexing (TDD) mode of communication between a UE and a base station. TDD means that only one endpoint (e.g., one of a UE or a base station) can send information to another end point (e.g., the other of the UE or the base station) at a time. For example, in TDD, transmissions in different directions on a given channel are separated from one another using time division multiplexing. That is, at some times the channel is dedicated for transmissions in one direction, while at other times the channel is dedicated for transmissions in the other direction. In some cases, the direction may change rapidly, such as several times per slot. Thus, as illustrated in FIG. 3A, downlink (DL) communications 302 are separated from uplink (UL) communications 304 in time.

FIG. 3B depicts a frequency division duplexing (FDD) mode of communication between a UE and a base station. FDD means that both endpoints can simultaneously communicate with one another on different frequencies (e.g., different frequency bands, sets of sub-carriers, or resource blocks). In the FDD mode, as shown in FIG. 3B, transmissions in different directions operate at different carrier frequencies. Thus, as illustrated in FIG. 3B, DL communications 302 are separated from UL communications 304 in frequency. In some cases, FDD may be referred to as full duplex because a wireless communication device may be capable of transmitting and receiving at the same time, where transmission uses a first frequency and reception uses a second frequency. Because simultaneous transmission and reception by a device in FDD use different frequencies, this full duplex mode may be referred to as out-of-band full duplex.

FIG. 3C depicts a true full duplex mode of communication between a UE and a base station. In the true full duplex mode, as shown in FIG. 3C, transmissions in different directions operate at the same carrier frequency or within overlapping bandwidths. In the example shown in FIG. 3C, DL communications 302 overlap UL communications 304 in both time and frequency. Thus, when operating in a true full duplex mode, the UE and base station are configured for concurrent transmission and reception within an overlapping bandwidth. That is, simultaneous transmission and reception by a device in this mode can use the same frequency. As a result this full duplex mode may be referred to as in-band full duplex.

As indicated above, FIGS. 3A-3C are provided as an example. Other examples may differ from what is described with respect to FIGS. 3A-3C.

Figure 4:
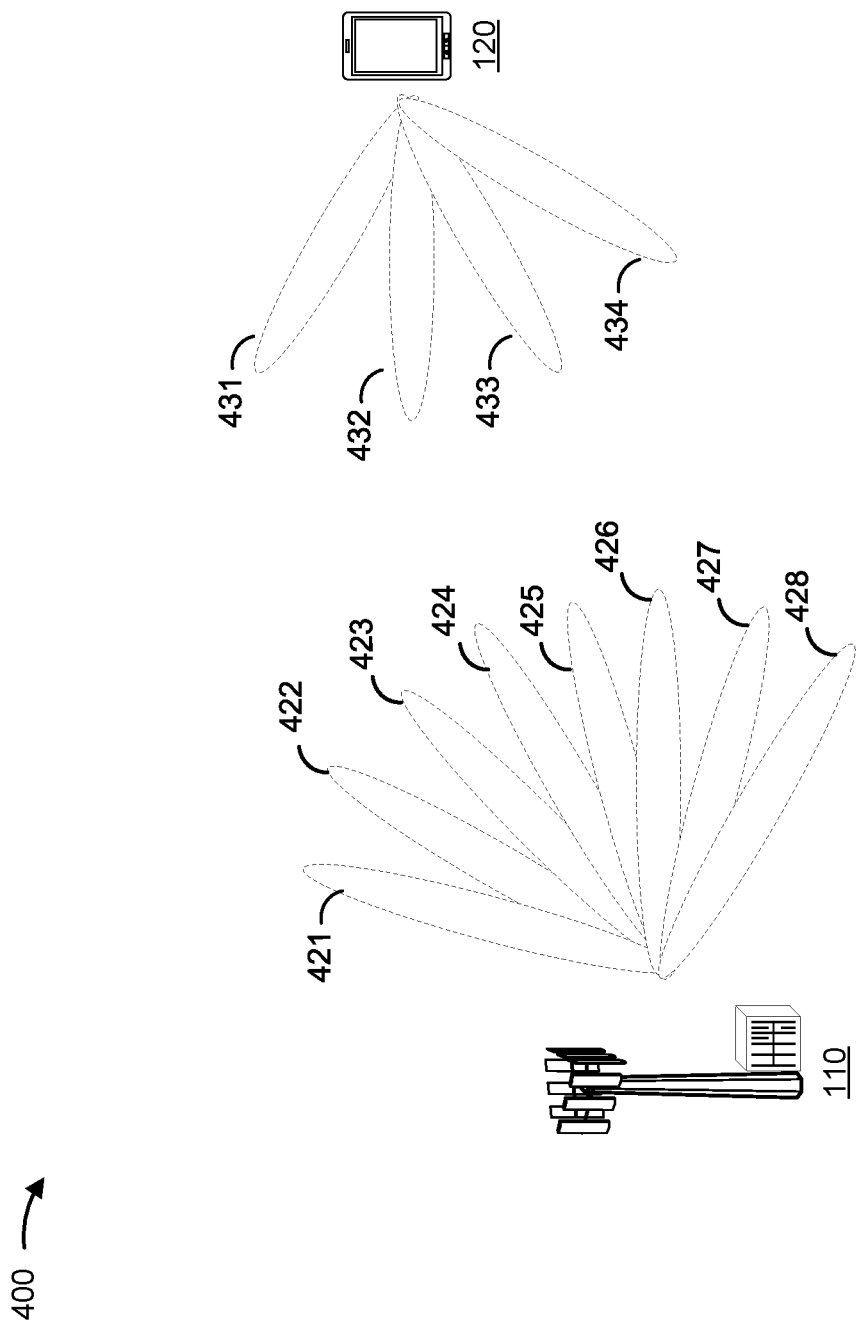
FIG. 4 is a diagram illustrating an example of beamforming in a wireless communication system, in accordance with various aspects of the present disclosure.
Figure 6:
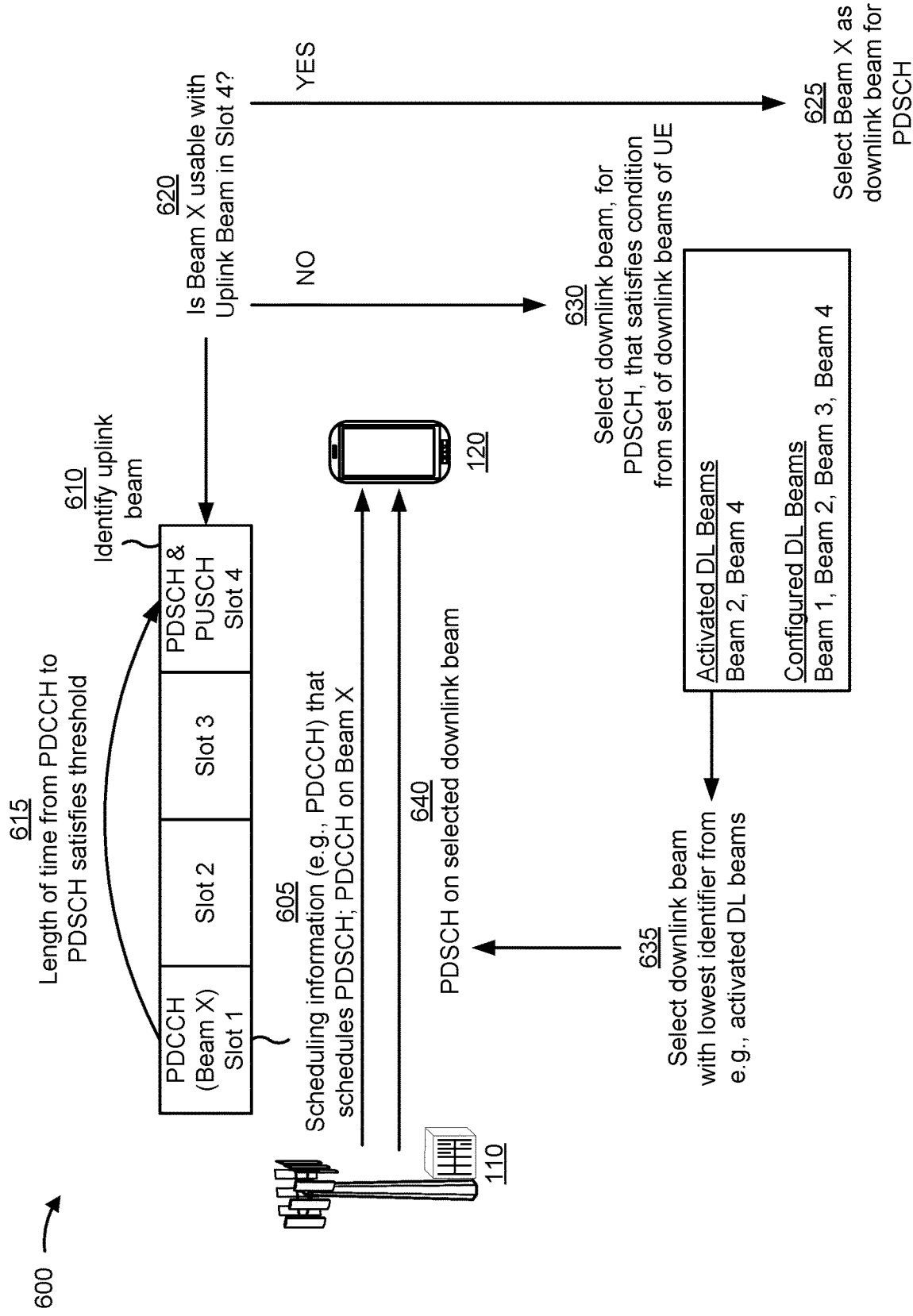

FIG. 4 is a diagram illustrating an example 400 of beamforming in a wireless communication system, in accordance with various aspects of the present disclosure. FIG. 6 shows communication between a base station 110 and a UE 120 using beamformed signals.

In NR, control and data may be communicated between the UE 120 and the base station 110 over one or more beams (e.g., paths). Each beam may have a different spatial relationship with other beams. For example, the base station 110 may transmit, and the UE 120 may receive, downlink information using one or more downlink beams. In this case, the base station 110 may transmit downlink information to the UE 120 using a transmit (TX) downlink beam (or a base station downlink beam), and the UE 120 may receive downlink information from the base station 110 using a receive (RX) downlink beam (or a UE downlink beam). Similarly, the UE 120 may transmit, and the base station 110 may receive, uplink information using one or more uplink beams. In this case, the UE 120 may transmit uplink information to the base station 110 using a TX uplink beam (or a UE uplink beam), and the base station 110 may receive uplink information from the UE 120 using an RX uplink beam (or a base station uplink beam).

In some aspects, the base station 110 and UE 120 may communicate using a beam pair link (BPL) that includes a pair of downlink/uplink beams (e.g., a downlink beam of the base station 110 and an uplink beam of the UE 120). Each of the downlink beams and uplink beams may be selected from a corresponding set of beams. In the example shown in FIG. 4, a downlink beam set contains eight different beams 421, 422, 423, 424, 425, 426, 427, 428, each associated with a different spatial beam direction. As further shown, an uplink beam set contains four different beams 431, 432, 433, and 434, each associated with a different spatial beam direction. It should be noted that while some beams are illustrated as adjacent to one another, such an arrangement may be different in different aspects. In some aspects, beams transmitted during a same symbol may not be adjacent to one another. In some examples, the base station 110 and/or UE 120 may transmit more or less beams distributed in all directions (e.g., 360 degrees).

In some aspects, the base station 110 may be configured to sweep or transmit each of the downlink beams 421, 422, 423, 424, 425, 426, 427, 428 during a synchronization slot. For example, the base station 110 may transmit a downlink reference signal, such as a synchronization signal block (SSB) or a channel state information reference signal (CSI-RS), on each downlink beam in the different beam directions during the synchronization slot. Transmission of the downlink reference signals may occur periodically (e.g., as configured via radio resource control (RRC) signaling by the base station 110), semi-persistently (e.g., as configured via RRC signaling and activated/deactivated via medium access control-control element (MAC-CE) signaling by the base station 110), or aperiodically (e.g., as triggered by the base station 110 via downlink control information (DCI)).

The UE 120 may use received downlink reference signals to identify the downlink beams and perform downlink beam quality measurements, such as reference signal received power (RSRP measurements or reference signal received quality (RSRQ) measurements, among other examples, on the downlink reference signals. The UE 120 may further perform additional beam quality measurements, such as signal strength (e.g., received signal strength indicator (RSSI)) or interference/noise (e.g., signal to interference plus noise ratio (SINR)) measurements on the downlink reference signals received on one or more of the downlink beams.

The UE 120 may then transmit a beam measurement report including a respective beam index and RSRP and/or other beam measurement(s) of each downlink beam 421-428. The base station 110 may then determine the downlink beam (e.g., downlink beam 424) on which to transmit unicast downlink control information and/or user data traffic to the UE 120 with the highest quality from the beam measurement report. Transmission of the beam measurement report may occur, semi-persistently, or aperiodically.

In other examples, when the channel is reciprocal (e.g., the downlink and uplink channel qualities are the same), the base station 110 may derive the downlink beam. Derivation can be based on uplink measurements, such as by measuring the received power, quality, or other variable of a respective sounding reference signal (SRS) or other uplink reference signal transmitted on each uplink beam 431, 432, 433, and 434 in the set of uplink beams. In some examples, the base station 110 may select not only the downlink beam, but also the uplink beam (e.g., beam 433) as part of the BPL based on the received beam measurement report and/or uplink measurements. In other examples, the UE 120 may select the uplink beam (e.g., beam 433) based on the downlink measurements or other factors. For example, the UE 120 may be configured for uplink non-codebook based MIMO or uplink beam management.

In some examples, the base station 110 may pre-configure each of the reference signals (e.g., downlink reference signals and uplink reference signals) to be communicated between the UE 120 and the base station 110 with particular time-frequency resources and particular beams/paths and provide configuration information for each of the reference signals to the UE 120 via, for example, RRC signaling. In some examples, the configuration information may include a transmission configuration indication (TCI) state that indicates quasi co-location (QCL) information (e.g., QCL Type and time-frequency resources) of the reference signal.

Examples of QCL information includes one or more of Doppler shift, Doppler spread, average delay, delay spread, and a spatial RX parameter (e.g., spatial property of the beam). The spatial property of the beam may include, for example, at least one of a beam direction, a beam width, or an associated downlink reference signal (e.g., a spatial QCL relationship with a downlink reference signal, such as a SSB or CSI-RS). In some examples, each of the reference signals may be pre-configured with the same or different TCI states (e.g., for downlink reference signals) or spatial QCL relationships (e.g., for uplink reference signals) with respect to the spatial beams or BPLs on which the reference signals are transmitted. Thus, each of the reference signals may be communicated on the same or different beams or BPLs.

When operating in a TDD (half-duplex) or FDD mode, the selection of the downlink beam based on downlink and/or uplink measurements taken in isolation (e.g., without consideration of communications occurring in the reverse direction) may result in an optimal downlink beam for communication between the UE 120 and the base station 110. However, when operating in full duplex mode (e.g., in-band full duplex mode), device self-interference due to concurrent transmission and reception in an overlapping bandwidth may severely degrade the performance of UE reception via the selected downlink beam. Self-interference may result from local reflection and refraction of power from the transmit antenna to the receive antenna and/or cross-talk between the transmit chain and receive chain. Although various mechanisms may be used to reduce self-interference, such as RF circuit isolation between the transmit chain and the receive chain, improved antenna design to avoid backflow of power from the transmit antenna to the receive antenna, and analog/digital self-interference cancellation to remove transmit leakage current, received downlink transmissions on the selected downlink beam may be affected by the presence of strong self-interference from concurrent uplink transmissions.

Therefore, in various aspects of the disclosure, downlink beam selection may further take into account the self-interference resulting from concurrent uplink transmissions. In some examples, the UE 120 may measure downlink beam quality in the presence of self-interference when operating in a full duplex mode to identify a set of usable downlink beams for each uplink beam. For example, for each uplink beam 431-434, the UE may obtain beam quality measurements associated with each of the downlink beams 421-428 to identify the respective set of usable downlink beams. In some examples, the downlink beams 421-428 on which beam quality measurements are obtained may include a set of configured or activated downlink beams or a corresponding subset thereof. The beam quality measurements may include one or more of RSRP, RSRQ, RSSI, and SINR. In some examples, the SINR may include a self-interference contribution.

In some aspects, the UE 120 may transmit a report to the base station 110 indicating the respective set of usable downlink beams for one or more of the uplink beams. In some examples, the report may include the beam measurement report transmitted from the UE 120 to the base station 110. In other examples, the report may include a separate report generated and transmitted from the UE 120 to the base station 110. In some examples, the report transmitted to the base station 110 may further include the respective QCL information for each of the downlink beams in the set of usable downlink beams. In some examples, the UE 120 may further identify a set of non-usable downlink beams for each uplink beam and include the set of non-usable downlink beams for the at least one uplink beam in the report.

In some aspects, the UE 120 may determine the set of usable downlink beams and the set of non-usable downlink beams by comparing the beam quality measurements to one or more thresholds. For example, for each uplink beam, the UE 120 may compare the beam quality measurements associated with each of the downlink beams to a first threshold and identify the set of usable downlink beams for which the beam quality measurements exceed the first threshold. As another example, for each uplink beam, the UE 120 may further compare the beam quality measurements associated with each of the downlink beams to a second threshold and identify the set of non-usable downlink beams for which the beam quality measurements are less than the second threshold. The UE 120 may receive a threshold amount and a hysteresis value from the base station 110 and determine the first threshold and the second threshold based on the threshold amount and hysteresis value. For example, the UE 120 may determine the first threshold by adding the hysteresis value to the threshold amount and the second threshold by subtracting the hysteresis value from the threshold amount.

In some cases, the UE 120 and the base station 110 may perform beam management, as described above, to determine favorable uplink beams (e.g., a TX uplink beam and/or an RX uplink beam) and downlink beams (e.g., a TX downlink beam and/or an RX downlink beam) for communication. In some cases, the base station 110 may indicate a downlink beam (sometimes referred to as a QCL-Type D relationship), to be used for a PDSCH communication (e.g., a PDSCH downlink beam), to the UE 120, such as in DCI that schedules the PDSCH communication (e.g., by indicating a TCI state in a TCI state field in the DCI, which may indicate the QCL-Type D). However, in some cases, the base station 110 may not indicate the PDSCH downlink beam in DCI (e.g., according to an RRC configuration), or the UE 120 may not be able to use an indicated downlink beam to receive the PDSCH communication, such as when the UE 120 does not have sufficient time to switch to the downlink beam before receiving the PDSCH communication or when the UE 120 does not have sufficient time to decode a PDCCH communication (e.g., that includes the DCI) before receiving the PDSCH communication, among other examples. In these cases, the UE 120 and the base station

110 may use a default downlink beam for the PDSCH communication so that the PDSCH communication can be received by the UE 120.

For example, if the UE 120 has sufficient time to decode the PDCCH communication before receiving the PDSCH communication, then the default PDSCH downlink beam may be the downlink beam used for the PDCCH communication. For example, a QCL relationship of a control resource set (CORESET) of the PDCCH communication may be used as the default downlink beam (e.g., a default QCL-Type D relationship). If the UE 120 does not have sufficient time to decode the PDCCH communication before receiving the PDSCH communication, then the default PDSCH downlink beam may be the downlink beam of the CORESET having a lowest CORESET identifier among all CORESETs monitored by the UE in an active bandwidth part in a last slot, before the PDSCH communication, that includes a CORESET for the UE 120.

However, in some cases, the downlink beam used for the PDCCH communication or the downlink beam of the CORESET having a lowest CORESET identifier may not be a usable downlink beam due to, for example, self-interference with an uplink beam used by the UE 120 in a same slot and/or in the same symbol(s) as the PDSCH communication. For example, an uplink beam used by the UE 120 in the same slot and/or symbol(s) as the PDSCH communication may change from an uplink beam previously used by the UE 120 in the same slot as the PDCCH communication or in the last slot before the PDSCH communication. Thus, using one of these downlink beams as the default downlink beam could degrade performance such that the UE 120 cannot successfully receive the PDSCH communication. Some techniques and apparatuses described herein enable the UE 120 and the base station 110 to select a default downlink beam that is also a usable downlink beam (as described above) so that the UE 120 can perform full duplex operations and successfully receive and transmit communications simultaneously when the default downlink beam is selected. Such successful reception may reduce errors, conserve network resources (e.g., by reducing a number of re-transmissions), reduce latency, increase throughput, improve reliability, and/or the like.

As indicated above, FIG. 4 is provided as an example. Other examples may differ from what is described with respect to FIG. 4.

Figure 5:
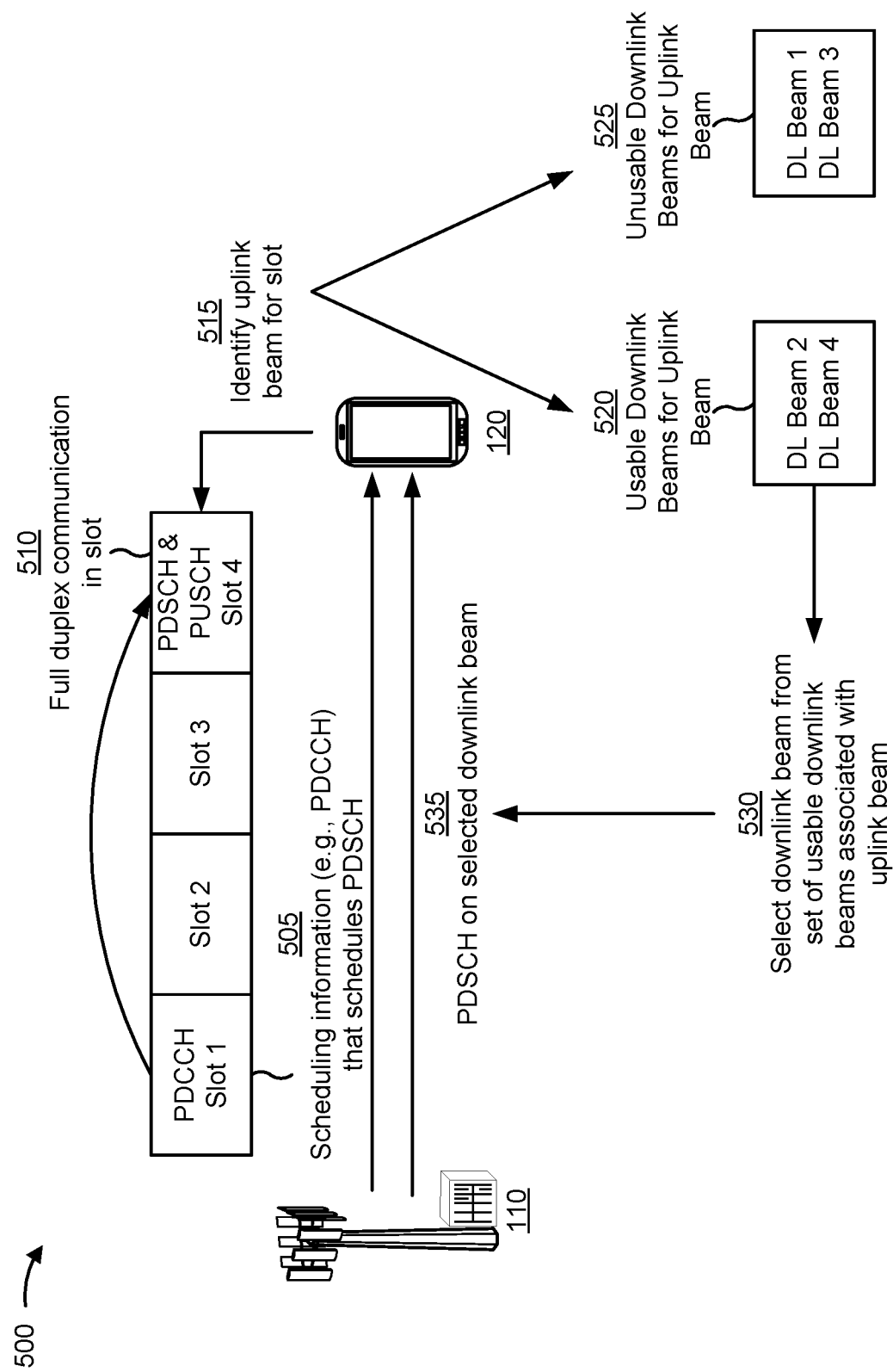
FIGS. 5-7 are diagrams illustrating examples of default physical downlink shared channel (PDSCH) downlink beam determination with self-interference, in accordance with various aspects of the present disclosure.

FIG. 5 is a diagram illustrating an example 500 of default PDSCH beam determination with self-interference, in accordance with various aspects of the present disclosure. As shown in FIG. 5, a base station 110 and a UE 120 may communicate with one another.

As shown by reference number 505, the base station 110 may transmit scheduling information to the UE 120, and the UE 120 may receive the scheduling information. In some aspects, the scheduling information may be carried in a PDCCH communication, such as in DCI carried on the PDCCH. The PDCCH communication may schedule a PDSCH communication for the UE 120, such as by indicating a resource allocation for the PDSCH communication (e.g., a set of time domain resources, a set of frequency domain resources, and/or the like). In example 500, the PDCCH communication is transmitted in slot 1, and schedules a PDSCH communication in slot 4.

As shown by reference number 510, the PDSCH communication may be scheduled in a same slot as an uplink communication by the UE 120, where the UE 120 operates in a full duplex mode (e.g., in-band full duplex). For example, the PDSCH communication may be scheduled in the same slot as a physical uplink shared channel (PUSCH) communication, a physical uplink control channel (PUCCH) communication, and/or the like. Additionally, or alternatively, the PDSCH communication may be scheduled in the same set of symbols and/or in one or more overlapping symbols with the uplink communication.

As shown by reference number 515, the UE 120 may identify an uplink beam to be used for the uplink communication in the slot (e.g., in the one or more symbols that overlap with the PDSCH communication). For example, the UE 120 may select an uplink beam to use for the uplink communication based at least in part on one or more measurements. Additionally, or alternatively, the base station 110 may indicate the uplink beam to the UE 120 (e.g., in DCI that schedules the uplink communication, in a MAC-CE that activates the uplink beam, and/or the like). In some aspects, the uplink beam may correspond to a sounding reference signal (SRS) resource. As shown, the uplink beam may be associated with a set of usable downlink beams and/or a set of unusable downlink beams.

As shown by reference number 520, the uplink beam may be associated with a set of usable downlink beams, shown as DL Beam 2 and DL Beam 4. As shown by reference number 525, the uplink beam may be associated with a set of unusable downlink beams, shown as DL Beam 1 and DL Beam 3. In some aspects, the UE 120 may determine the set of usable downlink beams and/or the set of unusable downlink beams associated with the uplink beam based at least in part on self-interference associated with full duplex communication by the UE 120 in the one or more overlapping symbols. For example, the UE 120 may measure downlink beam quality in the presence of self-interference when operating in a full duplex mode (e.g., in-band full duplex) to identify the set of usable downlink beams and/or the set of unusable downlink beams for the uplink beam. In some aspects, the downlink beams on which beam quality measurements are obtained may include a set of configured downlink beams, a set of activated downlink beams, and/or the like. The beam quality measurements may include one or more of RSRP, RSRQ, RSSI, and SINR. In some examples, the SINR may include a self-interference contribution. In some aspects, the UE 120 may determine the set of usable downlink beams and/or the set of non-usable downlink beams by comparing the beam quality measurements to one or more thresholds, as described above in connection with FIG. 4.

As shown by reference number 530, the UE 120 may select a downlink beam (e.g., a UE downlink beam, an RX downlink beam, a UE RX downlink beam, and/or the like) for reception of the PDSCH communication from the set of usable downlink beams associated with the uplink beam to be used by the UE 120 for uplink transmission in one or more symbols in which the PDSCH communication is scheduled. In some aspects, the downlink beam is a default downlink beam. Additionally, or alternatively, the downlink beam may correspond to a Type D QCL relationship (e.g., QCL-Type D). For example, the PDCCH communication (e.g., the DCI) may not indicate a downlink beam for the PDSCH communication (e.g., may not indicate a TCI state for the PDSCH communication). Alternatively, the PDCCH communication may indicate a downlink beam for the PDSCH communication, but the UE 120 may not be able to use the indicated downlink beam to receive the PDSCH communication, such as if the UE 120 does not have sufficient time to switch to the indicated downlink beam before receiving the PDSCH communication or if the UE 120 does not have sufficient time to decode the PDCCH communication before receiving the PDSCH communication, among other examples.

Additionally, or alternatively, the base station 110 may select a downlink beam (e.g., a BS downlink beam, a TX downlink beam, a BS TX downlink beam, and/or the like) for transmission of the PDSCH communication from the set of usable downlink beams associated with the uplink beam to be used by the UE 120 for uplink transmission in one or more symbols in which the PDSCH communication is scheduled. In some aspects, the UE 120 may transmit a report to the base station 110 indicating the set of usable downlink beams for the uplink beam. In some aspects, if the UE 120 selects the uplink beam, then the UE 120 may transmit an indication of the uplink beam to the base station 110. Alternatively, the base station 110 may select the uplink beam and transmit and indication of the uplink beam to the UE 120. In this way, the base station 110 and the UE 120 may select the same downlink beam for the PDSCH communication, thereby improving likelihood of successful reception of the PDSCH communication by the UE 120.

As shown by reference number 535, the base station 110 may transmit the PDSCH communication to the UE 120 on the selected downlink beam (e.g., a downlink beam selected by the base station 110, such as a BS downlink beam, a TX downlink beam, a BS TX downlink beam, and/or the like). The UE 120 may monitor for and/or receive the PDSCH communication on the selected downlink beam (e.g., a downlink beam selected by the UE 120, such as a UE downlink beam, an RX downlink beam, a UE RX downlink beam, and/or the like). By selecting a downlink beam that is a usable downlink beam with respect to an uplink beam used by the UE 120 to transmit in the same slot and/or symbol(s) in which the UE 120 receives the PDSCH communication, the UE 120 may avoid or mitigate self-interference issues and increase a likelihood of successfully decoding the PDSCH communication.

As indicated above, FIG. 5 is provided as an example. Other examples may differ from what is described with respect to FIG. 5.

FIG. 6 is a diagram illustrating an example 600 of default PDSCH beam determination with self-interference, in accordance with various aspects of the present disclosure. As shown in FIG. 6, a base station 110 and a UE 120 may communicate with one another.

As shown by reference number 605, the base station 110 may transmit scheduling information to the UE 120, and the UE 120 may receive the scheduling information. In some aspects, the scheduling information may be carried in a PDCCH communication, such as in DCI carried on the PDCCH. The PDCCH communication may schedule a PDSCH communication for the UE 120, such as by indicating a resource allocation for the PDSCH communication (e.g., a set of time domain resources, a set of frequency domain resources, and/or the like). In example 600, the PDCCH communication is transmitted in slot 1, and schedules a PDSCH communication in slot 4. Furthermore, the PDCCH communication is transmitted and received on a downlink beam shown as Beam X.

In some aspects, the PDCCH communication does not indicate a downlink beam to be used for the PDSCH communication. For example, the base station 110 may indicate, in a configuration (e.g., an RRC configuration message) to the UE 120, that the PDCCH communication (e.g., DCI) will not indicate a TCI state for the PDSCH communication. In this case, the UE 120 may need to identify a downlink beam (e.g., a default downlink beam) to be used for reception of the PDSCH communication using information other than a TCI state field in a PDCCH communication. Alternatively, the PDCCH communication may indicate the downlink beam to be used for the PDSCH communication, but the UE 120 may not have sufficient time to switch to the indicated downlink beam to receive the PDSCH communication. For example, an amount of time for the UE 120 to switch to the indicated downlink beam for the PDSCH communication may be less than a PDCCH decoding time threshold and/or a beam switch threshold associated with the UE 120. In this case, the UE 120 may need to identify a downlink beam (e.g., a default downlink beam) to be used for reception of the PDSCH communication using information other than the TCI state field in the PDCCH communication. The techniques described below can be used by the UE 120 and the base station 110 to identify the default downlink beam that is also a usable downlink beam, thereby improving the likelihood of successful reception and decoding of the PDSCH communication by the UE 120.

As shown by reference number 610, and as described above in connection with FIG. 5, the UE 120 may identify an uplink beam to be used for an uplink communication in the slot in which the PDSCH communication is scheduled (e.g., in the one or more symbols that overlap with the PDSCH communication). For example, the PDSCH communication may be scheduled in a same slot and/or symbol(s) as an uplink communication by the UE 120, where the UE 120 operates in a full duplex mode (e.g., in-band full duplex). The UE 120 may identify an uplink beam to be used for the uplink communication in the slot and/or symbol(s) that overlap with the PDSCH communication, as described above in connection with FIG. 5. The uplink beam may be associated with a set of usable downlink beams and/or a set of unusable downlink beams (e.g., due to self-interference), as described elsewhere herein.

As shown by reference number 615, a length of time (e.g., a delay) from the PDCCH communication (e.g., an end of the last symbol of a slot in which the PDCCH communication is received) to the PDSCH communication (e.g., a start of the first symbol of a slot in which the PDSCH communication is scheduled) may satisfy a threshold (e.g., may be greater than or equal to the threshold). In some aspects, the length of time may be determined by a k0 value, a last symbol location of the PDCCH communication, and/or a first symbol location of the PDSCH communication, one or more of which may be indicated in the PDCCH communication (e.g., in one or more fields of DCI that indicate the k0 value and/or the first symbol location of the PDSCH communication). The value of k0 may indicate a delay in number of slots from the PDCCH communication (e.g., a downlink grant) to the PDSCH communication (e.g., downlink data scheduled by the downlink grant). The UE 120 and/or the base station 110 may determine that the length of time satisfies the threshold (e.g., greater than or equal to a threshold value). In some aspects, the threshold may be based at least in part on a PDCCH decoding time, a beam switching timing threshold supported by the UE, and/or the like. As a result, the UE 120 may have sufficient time to decode the PDCCH communication and/or perform beam switching before receiving the PDSCH communication.

As shown by reference number 620, the UE 120 and/or the base station 110 may determine whether a downlink beam of the PDCCH communication (e.g., Beam X) is a usable downlink beam associated with the uplink beam. In some aspects, the UE 120 and/or the base station 110 may make this determination based at least in part on determining that the length of time satisfies the threshold. For example, the UE 120 may be capable of making this determination prior to reception of the PDSCH communication because the length of time satisfies the threshold. The UE 120 and/or the base station 110 may select a downlink beam (e.g., a default downlink beam) for reception of the PDSCH communication based at least in part on determining that the length of time satisfies the threshold and determining whether the downlink beam of the PDCCH communication is a usable downlink beam associated with the uplink beam.

For example, as shown by reference number 625, if the downlink beam of the PDCCH communication (e.g., Beam X) is a usable downlink beam associated with the uplink beam, then the UE 120 may select the downlink beam of the PDCCH communication for reception of the PDSCH communication. However, as shown by reference number 630, if the downlink beam of the PDCCH communication (e.g., Beam X) is an unusable downlink beam associated with the uplink beam, then the UE 120 may select, as the downlink beam for reception of the PDSCH communication, a usable downlink beam with a lowest downlink beam identifier among a set of downlink beams associated with the UE 120, such as a set of activated downlink beams (e.g., as indicated by a set of activated TCI states associated with the UE 120) or a set of configured downlink beams (e.g., as indicated by a set of configured TCI states associated with the UE 120), among other examples.

For example, the base station 110 may configure the UE 120 (e.g., in an RRC message) with a set of TCI states, referred to as a set of configured TCI states. The set of activated TCI states may be a subset of the set of configured TCI states. In some aspects, the base station 110 may indicate the activated TCI states to the UE 120, such as in a MAC-CE command. A TCI state may indicate a downlink beam (e.g., a QCL-Type D relationship). A TCI state may be identified by a TCI state identifier, which is an example of a downlink beam identifier.

The UE 120 and/or the base station 110 may select, as the downlink beam for reception of the PDSCH communication, a usable downlink beam with a TCI state that satisfies a condition among the set of activated TCI states or among the set of configured TCI states, such as a TCI state with the lowest TCI state identifier, with the highest TCI state identifier, or with a specific TCI state identifier. In some aspects, the UE 120 may identify a set of candidate downlink beams. The set of candidate downlink beams may include one or more downlink beams that are included in the set of usable beams associated with the uplink beam and that are also included in the set of activated downlink beams (or the set of configured downlink beams). The UE 120 may select a downlink beam having the lowest downlink beam identifier (e.g., the lowest value for a TCI state identifier) among the set of candidate downlink beams as the downlink beam to be used for reception of the PDSCH communication.

As a more particular example, and a shown by reference number 635, the UE 120 and/or the base station 110 may select, as the downlink beam for reception of the PDSCH communication, a usable downlink beam with a TCI state (e.g., downlink beam) having a lowest TCI state identifier (e.g., lowest beam identifier) among the set of activated TCI states or among the set of configured TCI states. In other words, the UE 120 and/or the base station 110 may select a downlink beam with a TCI state having a lowest TCI state identifier among a set of usable activated TCI states associated with the uplink beam or among a set of usable configured TCI states associated with the uplink beam.

As an example from FIG. 6, if the downlink beam is selected from a set of activated downlink beams that includes Beam 2 and Beam 4, and both Beams 2 and 4 are usable downlink beams, then the UE 120 may select Beam 2 because Beam 2 has a lower beam identifier than Beam 4 (e.g., 2<4). As another example from FIG. 6, if the downlink beam is selected from a set of configured downlink beams that includes Beam 1, Beam 2, Beam 3, and Beam 4, and all of Beams 1 through 4 are usable downlink beams, then the UE 120 may select Beam 1 because Beam 1 has the lowest beam identifier among the set of configured downlink beams. However, if Beam 1 is not usable and Beam 2 is usable, then the UE 120 may select Beam 2 as the downlink beam with the lowest beam identifier that is also a usable downlink beam associated with the uplink beam.

As shown by reference number 640, the base station 110 may transmit the PDSCH communication to the UE 120 on the selected downlink beam (e.g., a downlink beam selected by the base station 110, such as a BS downlink beam, a TX downlink beam, a BS TX downlink beam, and/or the like). The UE 120 may monitor for and/or receive the PDSCH communication on the selected downlink beam (e.g., a downlink beam selected by the UE 120, such as a UE downlink beam, an RX downlink beam, a UE RX downlink beam, and/or the like). By selecting a downlink beam that is a usable downlink beam with respect to an uplink beam used by the UE 120 to transmit in the same slot and/or symbol(s) in which the UE 120 receives the PDSCH communication, the UE 120 may avoid or mitigate self-interference issues and increase a likelihood of successfully decoding the PDSCH communication.

As indicated above, FIG. 6 is provided as an example. Other examples may differ from what is described with respect to FIG. 6.

Figure 7:
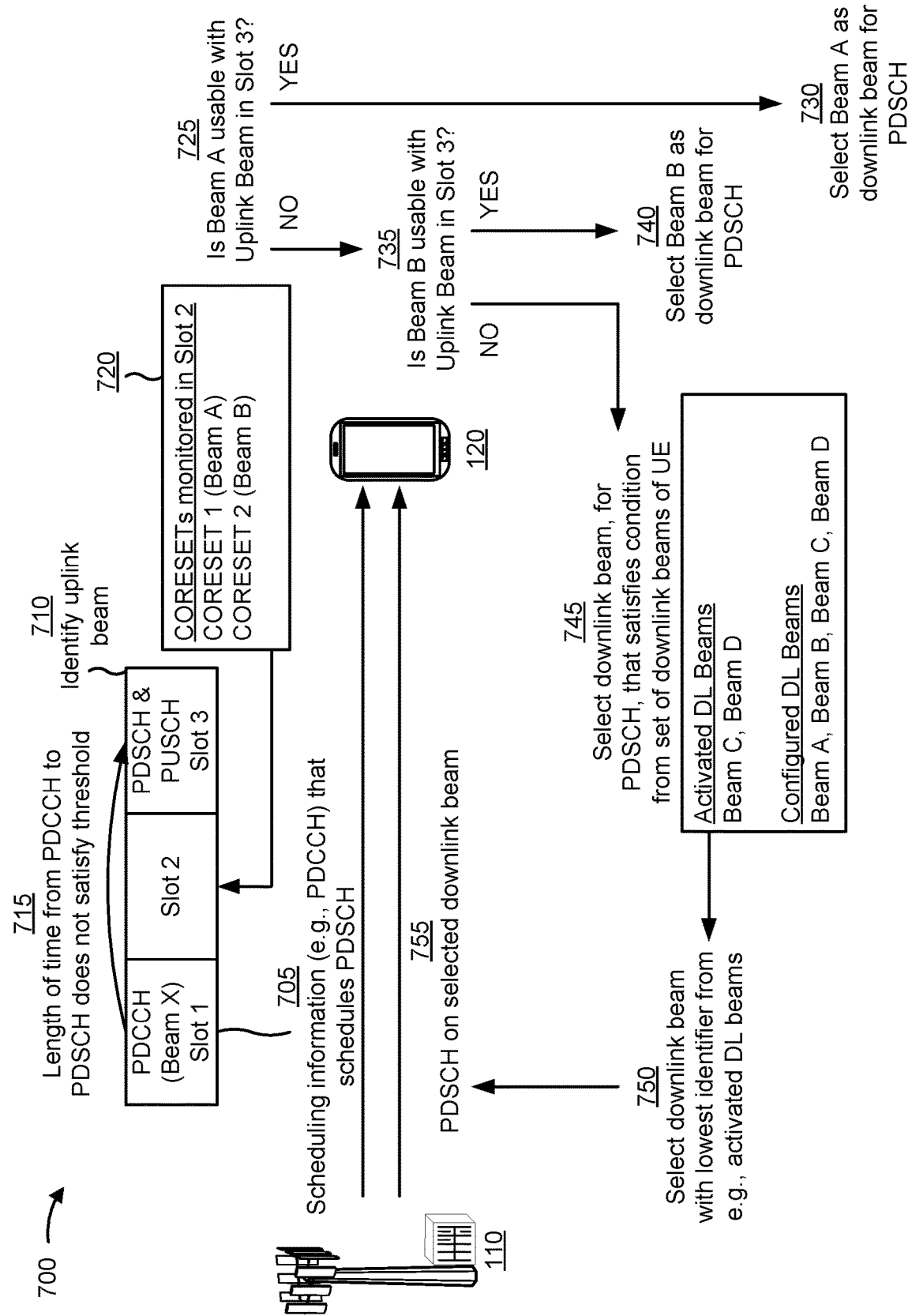

FIG. 7 is a diagram illustrating an example 700 of default PDSCH beam determination with self-interference, in accordance with various aspects of the present disclosure. As shown in FIG. 7, a base station 110 and a UE 120 may communicate with one another.

As shown by reference number 705, the base station 110 may transmit scheduling information to the UE 120, and the UE 120 may receive the scheduling information. In some aspects, the scheduling information may be carried in a PDCCH communication, such as in DCI carried on the PDCCH. The PDCCH communication may schedule a PDSCH communication for the UE 120, such as by indicating a resource allocation for the PDSCH communication (e.g., a set of time domain resources, a set of frequency domain resources, and/or the like). In example 700, the PDCCH communication is transmitted in slot 1, and schedules a PDSCH communication in slot 3.

As shown by reference number 710, and as described above in connection with FIG. 5, the UE 120 may identify an uplink beam to be used for an uplink communication in the slot in which the PDSCH communication is scheduled (e.g., in the one or more symbols that overlap with the PDSCH communication). For example, the PDSCH communication may be scheduled in a same slot and/or symbol(s) as an uplink communication by the UE 120, where the UE 120 operates in a full duplex mode (e.g., in-band full duplex). The UE 120 may identify an uplink beam to be used for the uplink communication in the slot and/or symbol(s) that overlap with the PDSCH communication, as described above in connection with FIG. 5. The uplink beam may be associated with a set of usable downlink beams and/or a set of unusable downlink beams (e.g., due to self-interference), as described elsewhere herein.

As shown by reference number 715, a length of time (e.g., a delay) from the PDCCH communication (e.g., the end of the last symbol of a slot in which the PDCCH communication is received) to the PDSCH communication (e.g., the start of the first symbol of a slot in which the PDSCH communication is scheduled) may not satisfy a threshold (e.g., may be less than the threshold). In some aspects, the length of time may be related to a k0 value, as described above. The UE 120 and/or the base station 110 may determine that the length of time does not satisfy the threshold (e.g., less than a threshold). As a result, the UE 120 may not have sufficient time to decode the PDCCH communication before receiving the PDSCH communication.

As shown by reference number 720, the UE 120 may monitor a set of control resource sets (CORESETs) in an active bandwidth part (BWP) in slot 2, which is the last slot, before the PDSCH communication, that includes a CORESET monitored by the UE 120. For example, the base station 110 may configure the UE 120 (e.g., in an RRC message) with a configured set of CORESETs. One or more of the configured CORESETs may be associated with search space sets that have a periodicity and offset such that the UE 120 monitors those CORESET(s) in slot 2. A CORESET may be identified by a CORESET identifier, shown in example 700 as CORESET 1 and CORESET 2. Furthermore, a CORESET may be transmitted using a downlink beam, and the UE 120 may monitor the downlink beam to monitor for the CORESET. In example 700, CORESET 1 is transmitted using downlink Beam A, and CORESET 2 is transmitted using downlink Beam B. A CORESET may carry a PDCCH communication (e.g., in a PDCCH monitoring occasion associated with the CORESET).

In example 700, the last slot, before the PDSCH communication, that includes a PDCCH monitoring occasion associated with a CORESET monitored by the UE 120 is slot 2, which is a slot that occurs immediately before the slot that includes the PDSCH communication. However, in some examples, the last slot, before the PDSCH communication, that includes a CORESET monitored by the UE 120 may be a slot that does not occur immediately before the slot that includes the PDSCH communication (e.g., the last slot may be slot 1, in some examples). For brevity, the last slot, before the PDSCH communication, that includes a CORESET monitored by the UE 120 may be referred to herein as a "last slot."

As shown by reference number 725, the UE 120 and/or the base station 110 may determine whether a downlink beam, of a CORESET having a lowest CORESET identifier (e.g., CORESET 1 in example 700) among all CORESETs monitored by the UE in an active BWP in the last slot (e.g., CORESETs 1 and 2 in example 700), is a usable downlink beam associated with the uplink beam. In example 700, the UE 120 determines whether Beam A is a usable downlink beam because Beam A is used for transmission of CORESET 1, which has the lowest CORESET identifier (e.g., 1) of CORESET 1 and CORESET 2. In some aspects, the UE 120 and/or the base station 110 may make this determination based at least in part on determining that the length of time does not satisfy the threshold. The UE 120 and/or the base station 110 may select a downlink beam (e.g., a default downlink beam) for reception of the PDSCH communication based at least in part on determining that the length of time does not satisfy the threshold and determining whether the downlink beam, of the CORESET having a lowest CORESET identifier among all CORESETs monitored by the UE in an active BWP in the last slot, is a usable downlink beam For example, as shown by reference number 730, if the downlink beam of the CORESET having the lowest CORESET identifier (e.g., Beam A) is a usable downlink beam associated with the uplink beam, then the UE 120 may select that downlink beam (e.g., Beam A) for reception of the PDSCH communication. However, if the downlink beam of the CORESET having the lowest CORESET identifier (e.g., Beam A) is an unusable downlink beam associated with the uplink beam, then the UE 120 may select, as the downlink beam for reception of the PDSCH communication, a usable downlink beam of a CORESET having a lowest CORESET identifier among a set of CORESETs, for which a corresponding downlink beam is a usable downlink beam, monitored by the UE 120 in the active BWP in the last slot.

In some aspects, the UE 120 may determine whether at least one CORESET (e.g., any CORESETs) monitored by the UE 120 in the active BWP in the last slot is associated with a usable downlink beam. If at least one CORESET monitored by the UE 120 in the active BWP in the last slot is associated with a usable downlink beam, then the UE 120 may identify a set of candidate downlink beams as the usable downlink beams (associated with the uplink beam) that are used to monitor for a CORESET in the active BWP in the last slot. The UE 120 may select, from the set of candidate downlink beams, a downlink beam used for the CORESET having the lowest CORESET identifier. In some aspects, the UE 120 may identify a set of candidate CORESETs for which a corresponding downlink beam is a usable downlink beam associated with the uplink beam. The UE 120 may identify the CORESET, among the set of candidate CORESETs, having a lowest CORESET identifier, and may select the downlink beam associated with that CORESET.

In example 700, the UE 120 monitors two CORESETs, CORESET 1 and CORESET 2, in the active BWP in the last slot. CORESET 1 is transmitted on Beam A, and CORESET 2 is transmitted on Beam B. In this example, if Beam A is not a usable downlink beam for the uplink beam, then the UE 120 may determine whether Beam B is a usable downlink beam for the uplink beam, as shown by reference number 735. If Beam B is a usable downlink beam for the uplink beam, then the UE 120 may select Beam B (associated with CORESET 2) for reception of the PDSCH communication, as shown by reference number 740.

As shown by reference number 745, if none of the CORESETs monitored by the UE 120 in the active BWP in the last slot is associated with a usable downlink beam, then the UE 120 may select a usable downlink beam with a lowest downlink beam identifier (or that satisfies another condition, as described above) among a set of downlink beams associated with the UE 120, as described above in connection with FIG. 6. As described above, the set of downlink beams associated with the UE 120 may include a set of activated downlink beams (e.g., as indicated by a set of activated TCI states associated with the UE 120) or a set of configured downlink beams (e.g., as indicated by a set of configured TCI states associated with the UE 120), among other examples.

As a more particular example, and a shown by reference number 750, the UE 120 and/or the base station 110 may select, as the downlink beam for reception of the PDSCH communication, a usable downlink beam with a TCI state (e.g., downlink beam) having a lowest TCI state identifier (e.g., lowest beam identifier) among the set of activated TCI states or among the set of configured TCI states. In other words, the UE 120 and/or the base station 110 may select a downlink beam with a TCI state having a lowest TCI state identifier among a set of usable activated TCI states associated with the uplink beam or among a set of usable configured TCI states associated with the uplink beam.

As an example from FIG. 7, if the downlink beam is selected from a set of activated downlink beams that includes Beam C and Beam D, and both Beams C and D are usable downlink beams, then the UE 120 may select Beam C because Beam C has a lower beam identifier than Beam D (e.g., C<D in this example). As another example from FIG. 7, if the downlink beam is selected from a set of configured downlink beams that includes Beam A, Beam B, Beam C, and Beam D, and all of Beams A through D are usable downlink beams, then the UE 120 may select Beam A because Beam A has the lowest beam identifier among the set of configured downlink beams. However, if Beams A, B, and C are unusable, as an example, then the UE 120 may select Beam D as the downlink beam with the lowest beam identifier that is also a usable downlink beam associated with the uplink beam.

As shown by reference number 755, the base station 110 may transmit the PDSCH communication to the UE 120 on the selected downlink beam (e.g., a downlink beam selected by the base station 110, such as a BS downlink beam, a TX downlink beam, a BS TX downlink beam, and/or the like). The UE 120 may monitor for and/or receive the PDSCH communication on the selected downlink beam (e.g., a downlink beam selected by the UE 120, such as a UE downlink beam, an RX downlink beam, a UE RX downlink beam, and/or the like). By selecting a downlink beam that is a usable downlink beam with respect to an uplink beam used by the UE 120 to transmit in the same slot and/or symbol(s) in which the UE 120 receives the PDSCH communication, the UE 120 may avoid or mitigate self-interference issues and increase a likelihood of successfully decoding the PDSCH communication.

As indicated above, FIG. 7 is provided as an example. Other examples may differ from what is described with respect to FIG. 7.

Figure 8:
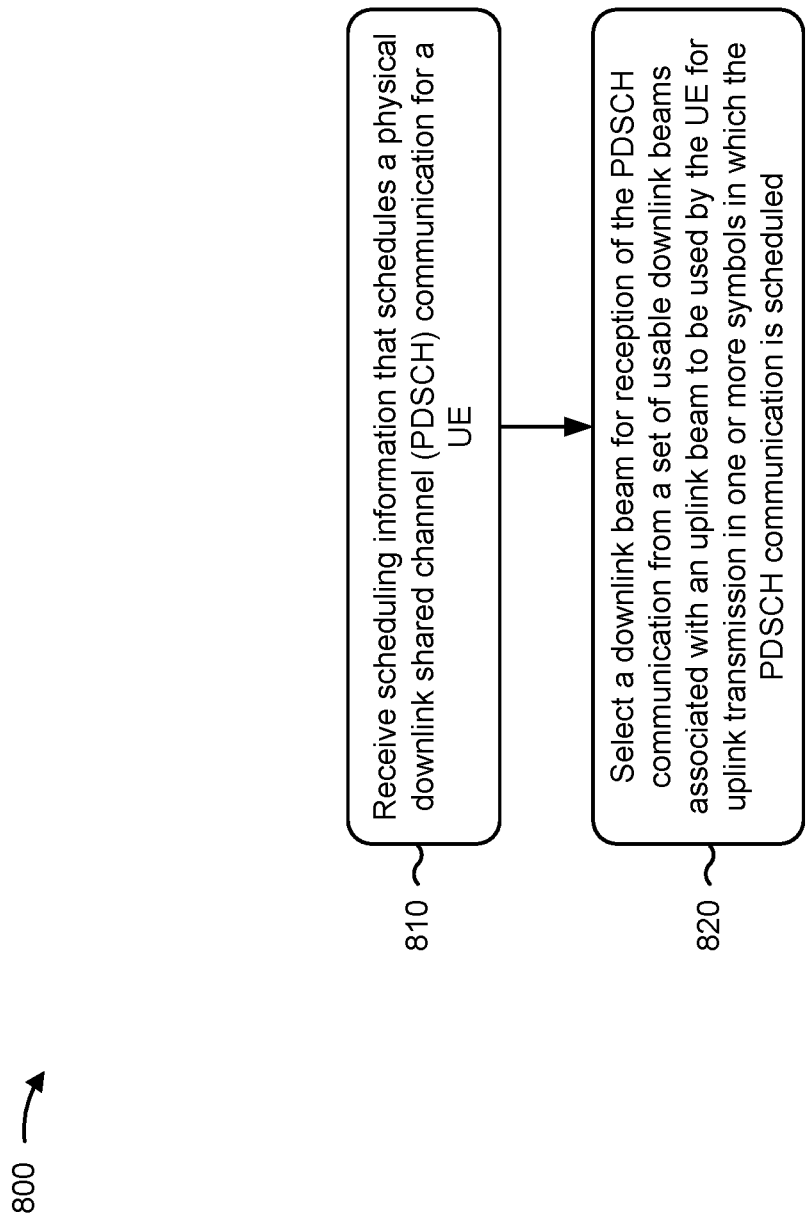
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where the UE (e.g., UE 120, the apparatus 1002 of FIG. 10, and/or the like) performs operations associated with default PDSCH downlink beam determination with self-interference.

As shown in FIG. 8, in some aspects, process 800 may include receiving scheduling information that schedules a PDSCH communication for the UE (block 810). For example, the UE (e.g., using receive processor 258, controller/processor 280, memory 282, and/or the like) may receive scheduling information that schedules a PDSCH communication for the UE, as described above in connection with FIGS. 5-7.

As further shown in FIG. 8, in some aspects, process 800 may include selecting a downlink beam for reception of the PDSCH communication from a set of usable downlink beams associated with an uplink beam to be used by the UE for uplink transmission in one or more symbols in which the PDSCH communication is scheduled (block 820). For example, the UE (e.g., using receive processor 258, transmit processor 264, controller/processor 280, memory 282, and/or the like) may select a downlink beam for reception of the PDSCH communication from a set of usable downlink beams associated with an uplink beam to be used by the UE for uplink transmission in one or more symbols in which the PDSCH communication is scheduled, as described above in connection with FIGS. 5-7.

Process 800 may include additional aspects, such as any single aspect or any combination of aspects described below and/or in connection with one or more other processes described elsewhere herein.

In a first aspect, the set of usable downlink beams is determined based at least in part on self-interference associated with full duplex communication by the UE in the one or more symbols.

In a second aspect, alone or in combination with the first aspect, the uplink beam is associated with the set of usable downlink beams and a set of unusable downlink beams.

In a third aspect, alone or in combination with one or more of the first and second aspects, the downlink beam corresponds to a Type D quasi co-location relationship.

In a fourth aspect, alone or in combination with one or more of the first through third aspects, the uplink beam corresponds to a sounding reference signal resource.

In a fifth aspect, alone or in combination with one or more of the first through fourth aspects, process 800 includes determining that a length of time from a PDCCH communication, that schedules the PDSCH communication, to the PDSCH communication satisfies a threshold; determining whether a downlink beam of the PDCCH communication that schedules the PDSCH communication is a usable downlink beam associated with the uplink beam based at least in part on determining that the length of time satisfies the threshold; and selecting the downlink beam for reception of the PDSCH communication based at least in part on determining that the length of time satisfies the threshold and determining whether the downlink beam of the PDCCH communication that schedules the PDSCH communication is a usable downlink beam. In some aspects, the threshold is a beam switching timing threshold supported by the UE.

In a sixth aspect, alone or in combination with one or more of the first through fifth aspects, selecting the downlink beam for reception of the PDSCH communication comprises: selecting the downlink beam of the PDCCH communication that schedules the PDSCH communication if the downlink beam of the PDCCH communication that schedules the PDSCH communication is a usable downlink beam, or selecting a usable downlink beam with a lowest downlink beam identifier among a set of downlink beams associated with the UE if the downlink beam of the PDCCH communication that schedules the PDSCH communication is an unusable downlink beam.

In a seventh aspect, alone or in combination with one or more of the first through sixth aspects, the set of downlink beams associated with the UE is one of a set of activated downlink beams for the UE or a set of configured downlink beams for the UE.

In an eighth aspect, alone or in combination with one or more of the first through seventh aspects, the downlink beam identifier is a transmission configuration indication state identifier.

In a ninth aspect, alone or in combination with one or more of the first through eighth aspects, the PDCCH communication does not indicate a downlink beam to be used for the PDSCH communication.

In a tenth aspect, alone or in combination with one or more of the first through ninth aspects, the PDCCH communication indicates a downlink beam to be used for the PDSCH communication but an amount of time for the UE to switch to the downlink beam for the PDSCH communication is less than a minimum PDCCH decoding time that is supported by the UE.

In an eleventh aspect, alone or in combination with one or more of the first through tenth aspects, process 800 includes determining that a length of time from a PDCCH communication, that schedules the PDSCH communication, to the PDSCH communication does not satisfy a threshold; determining whether a downlink beam, of a control resource set (CORESET) having a lowest CORESET identifier among all CORESETs monitored by the UE in an active bandwidth part in a last slot, before the PDSCH communication, that includes a CORESET for the UE, is a usable downlink beam based at least in part on determining that the length of time does not satisfy the threshold; and selecting the downlink beam for reception of the PDSCH communication based at least in part on determining that the length of time does not satisfy the threshold and determining whether the downlink beam of the CORESET having the lowest CORESET identifier is a usable downlink beam. In some aspects, the threshold is a beam switching timing threshold supported by the UE.

In a twelfth aspect, alone or in combination with one or more of the first through eleventh aspects, selecting the downlink beam for reception of the PDSCH communication comprises: selecting the downlink beam of the CORESET having the lowest CORESET identifier among all CORESETs monitored by the UE in the active bandwidth part in the last slot if the downlink beam of the CORESET having the lowest CORESET identifier among all CORESETs monitored by the UE in the active bandwidth part in the last slot is a usable downlink beam, selecting a usable downlink beam of a CORESET having a lowest CORESET identifier among a set of CORESETs, for which a corresponding downlink beam is a usable downlink beam, monitored by the UE in the active bandwidth part in the last slot if at least one CORESET monitored by the UE in the active bandwidth part in the last slot is associated with a usable downlink beam, or selecting a usable downlink beam with a lowest downlink beam identifier among a set of downlink beams associated with the UE if none of the CORESETs monitored by the UE in the active bandwidth part in the last slot is associated with a usable downlink beam.

In a thirteenth aspect, alone or in combination with one or more of the first through twelfth aspects, the set of downlink beams associated with the UE is one of a set of activated downlink beams for the UE or a set of configured downlink beams for the UE.

In a fourteenth aspect, alone or in combination with one or more of the first through thirteenth aspects, the downlink beam identifier is a transmission configuration indication state identifier.

In a fifteenth aspect, alone or in combination with one or more of the first through fourteenth aspects, process 800 includes determining that a length of time from a PDCCH communication, that schedules the PDSCH communication, to the PDSCH communication does not satisfy a threshold; determining whether at least one CORESET, monitored by the UE in an active bandwidth part in a last slot, before the PDSCH communication, that includes a CORESET for the UE, is associated with a usable downlink beam; and selecting the downlink beam for reception of the PDSCH communication based at least in part on determining that the length of time does not satisfy the threshold and determining whether at least one CORESET monitored by the UE in the active bandwidth part in the last slot is associated with a usable downlink beam. In some aspects, the threshold is a beam switching timing threshold supported by the UE.

In a sixteenth aspect, alone or in combination with one or more of the first through fifteenth aspects, selecting the downlink beam for reception of the PDSCH communication comprises: selecting a usable downlink beam of a CORESET having a lowest CORESET identifier among a set of CORESETs, for which a corresponding downlink beam is a usable downlink beam, monitored by the UE in the active bandwidth part in the last slot if at least one CORESET monitored by the UE in the active bandwidth part in the last slot is associated with a usable downlink beam, or selecting a usable downlink beam with a lowest downlink beam identifier among a set of downlink beams associated with the UE if none of the CORESETs monitored by the UE in the active bandwidth part in the last slot is associated with a usable downlink beam.

In a seventeenth aspect, alone or in combination with one or more of the first through sixteenth aspects, the set of downlink beams associated with the UE is one of a set of activated downlink beams for the UE or a set of configured downlink beams for the UE.

In an eighteenth aspect, alone or in combination with one or more of the first through seventeenth aspects, the downlink beam identifier is a transmission configuration indication state identifier.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
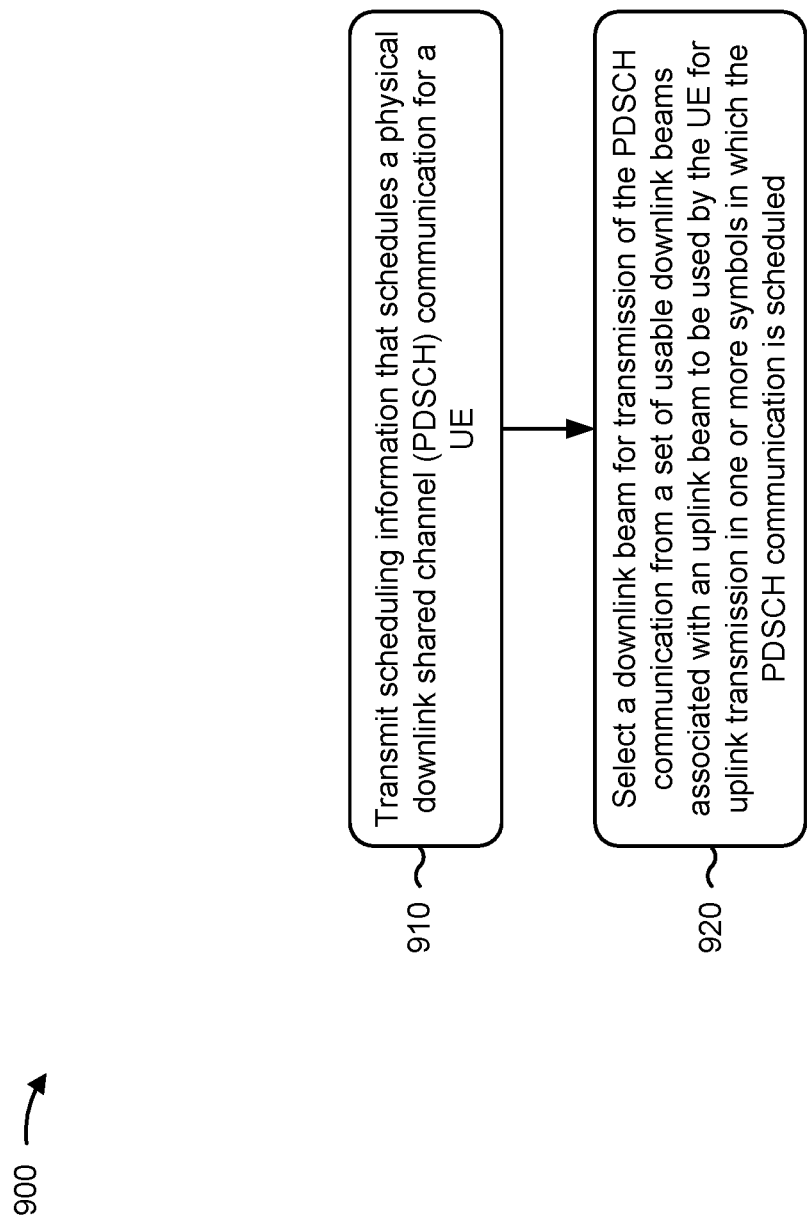
FIG. 9 is a diagram illustrating an example process performed, for example, by a base station, in accordance with various aspects of the present disclosure.

FIG. 9 is a diagram illustrating an example process 900 performed, for example, by a base station, in accordance with various aspects of the present disclosure. Example process 900 is an example where the base station (e.g., base station 110, the apparatus 1202 of FIG. 12, and/or the like) performs operations associated with default PDSCH beam determination with self-interference.

As shown in FIG. 9, in some aspects, process 900 may include transmitting scheduling information that schedules a PDSCH communication for a UE (block 910). For example, the base station (e.g., using transmit processor 220, controller/processor 240, memory 242, and/or the like) may transmit scheduling information that schedules a PDSCH communication for a UE, as described above in connection with FIGS. 5-7.

As further shown in FIG. 9, in some aspects, process 900 may include selecting a downlink beam for transmission of the PDSCH communication from a set of usable downlink beams associated with an uplink beam to be used by the UE for uplink transmission in one or more symbols in which the PDSCH communication is scheduled (block 920). For example, the base station (e.g., using transmit processor 220, receive processor 238, controller/processor 240, memory 242, and/or the like) may select a downlink beam for transmission of the PDSCH communication from a set of usable downlink beams associated with an uplink beam to be used by the UE for uplink transmission in one or more symbols in which the PDSCH communication is scheduled, as described above in connection with FIGS. 5-7.

Process 900 may include additional aspects, such as any single aspect or any combination of aspects described below and/or in connection with one or more other processes described elsewhere herein.

In a first aspect, the set of usable downlink beams is indicated to the base station by the UE.

In a second aspect, alone or in combination with the first aspect, the uplink beam is associated with the set of usable downlink beams and a set of unusable downlink beams.

In a third aspect, alone or in combination with one or more of the first and second aspects, the downlink beam corresponds to a Type D quasi co-location relationship.

In a fourth aspect, alone or in combination with one or more of the first through third aspects, the uplink beam corresponds to a sounding reference signal resource.

In a fifth aspect, alone or in combination with one or more of the first through fourth aspects, process 900 includes determining that a length of time from a PDCCH communication, that schedules the PDSCH communication, to the PDSCH communication satisfies a threshold; determining whether a downlink beam of the PDCCH communication that schedules the PDSCH communication is a usable downlink beam associated with the uplink beam based at least in part on determining that the length of time satisfies the threshold; and selecting the downlink beam for transmission of the PDSCH communication based at least in part on determining that the length of time satisfies the threshold and determining whether the downlink beam of the PDCCH communication that schedules the PDSCH communication is a usable downlink beam. In some aspects, the threshold is a beam switching timing threshold supported by the UE.

In a sixth aspect, alone or in combination with one or more of the first through fifth aspects, selecting the downlink beam for transmission of the PDSCH communication comprises: selecting the downlink beam of the PDCCH communication that schedules the PDSCH communication if the downlink beam of the PDCCH communication that schedules the PDSCH communication is a usable downlink beam, or selecting a usable downlink beam with a lowest downlink beam identifier among a set of downlink beams associated with the UE if the downlink beam of the PDCCH communication that schedules the PDSCH communication is an unusable downlink beam.

In a seventh aspect, alone or in combination with one or more of the first through sixth aspects, the set of downlink beams associated with the UE is one of a set of activated downlink beams for the UE or a set of configured downlink beams for the UE.

In an eighth aspect, alone or in combination with one or more of the first through seventh aspects, the downlink beam identifier is a transmission configuration indication state identifier.

In a ninth aspect, alone or in combination with one or more of the first through eighth aspects, the PDCCH communication does not indicate a downlink beam to be used for the PDSCH communication.

In a tenth aspect, alone or in combination with one or more of the first through ninth aspects, the PDCCH communication indicates a downlink beam to be used for the PDSCH communication but an amount of time for the UE to switch to the downlink beam for the PDSCH communication is less than a minimum PDCCH decoding time that is supported by the UE.

In an eleventh aspect, alone or in combination with one or more of the first through tenth aspects, process 900 includes determining that a length of time from a PDCCH communication, that schedules the PDSCH communication, to the PDSCH communication does not satisfy a threshold; determining whether a downlink beam, of a control resource set (CORESET) having a lowest CORESET identifier among all CORESETs monitored by the UE in an active bandwidth part in a last slot, before the PDSCH communication, that includes a CORESET for the UE, is a usable downlink beam based at least in part on determining that the length of time does not satisfy the threshold; and selecting the downlink beam for transmission of the PDSCH communication based at least in part on determining that the length of time does not satisfy the threshold and determining whether the downlink beam of the CORESET having the lowest CORESET identifier is a usable downlink beam. In some aspects, the threshold is a beam switching timing threshold supported by the UE.

In a twelfth aspect, alone or in combination with one or more of the first through eleventh aspects, selecting the downlink beam for transmission of the PDSCH communication comprises: selecting the downlink beam of the CORESET having the lowest CORESET identifier among all CORESETs monitored by the UE in the active bandwidth part in the last slot if the downlink beam of the CORESET having the lowest CORESET identifier among all CORESETs monitored by the UE in the active bandwidth part in the last slot is a usable downlink beam, selecting a usable downlink beam of a CORESET having a lowest CORESET identifier among a set of CORESETs, for which a corresponding downlink beam is a usable downlink beam, monitored by the UE in the active bandwidth part in the last slot if at least one CORESET monitored by the UE in the active bandwidth part in the last slot is associated with a usable downlink beam, or selecting a usable downlink beam with a lowest downlink beam identifier among a set of downlink beams associated with the UE if none of the CORESETs monitored by the UE in the active bandwidth part in the last slot is associated with a usable downlink beam.

In a thirteenth aspect, alone or in combination with one or more of the first through twelfth aspects, the set of downlink beams associated with the UE is one of a set of activated downlink beams for the UE or a set of configured downlink beams for the UE.

In a fourteenth aspect, alone or in combination with one or more of the first through thirteenth aspects, the downlink beam identifier is a transmission configuration indication state identifier.

In a fifteenth aspect, alone or in combination with one or more of the first through fourteenth aspects, process 900 includes determining that a length of time from a PDCCH communication, that schedules the PDSCH communication, to the PDSCH communication does not satisfy a threshold; determining whether at least one control resource set (CORESET), monitored by the UE in an active bandwidth part in a last slot, before the PDSCH communication, that includes a CORESET for the UE, is associated with a usable downlink beam; and selecting the downlink beam for transmission of the PDSCH communication based at least in part on determining that the length of time does not satisfy the threshold and determining whether at least one CORESET monitored by the UE in the active bandwidth part in the last slot is associated with a usable downlink beam. In some aspects, the threshold is a beam switching timing threshold supported by the UE.

In a sixteenth aspect, alone or in combination with one or more of the first through fifteenth aspects, selecting the downlink beam for transmission of the PDSCH communication comprises: selecting a usable downlink beam of a CORESET having a lowest CORESET identifier among a set of CORESETs, for which a corresponding downlink beam is a usable downlink beam, monitored by the UE in the active bandwidth part in the last slot if at least one CORESET monitored by the UE in the active bandwidth part in the last slot is associated with a usable downlink beam, or selecting a usable downlink beam with a lowest downlink beam identifier among a set of downlink beams associated with the UE if none of the CORESETs monitored by the UE in the active bandwidth part in the last slot is associated with a usable downlink beam.

In a seventeenth aspect, alone or in combination with one or more of the first through sixteenth aspects, the set of downlink beams associated with the UE is one of a set of activated downlink beams for the UE or a set of configured downlink beams for the UE.

In an eighteenth aspect, alone or in combination with one or more of the first through seventeenth aspects, the downlink beam identifier is a transmission configuration indication state identifier.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
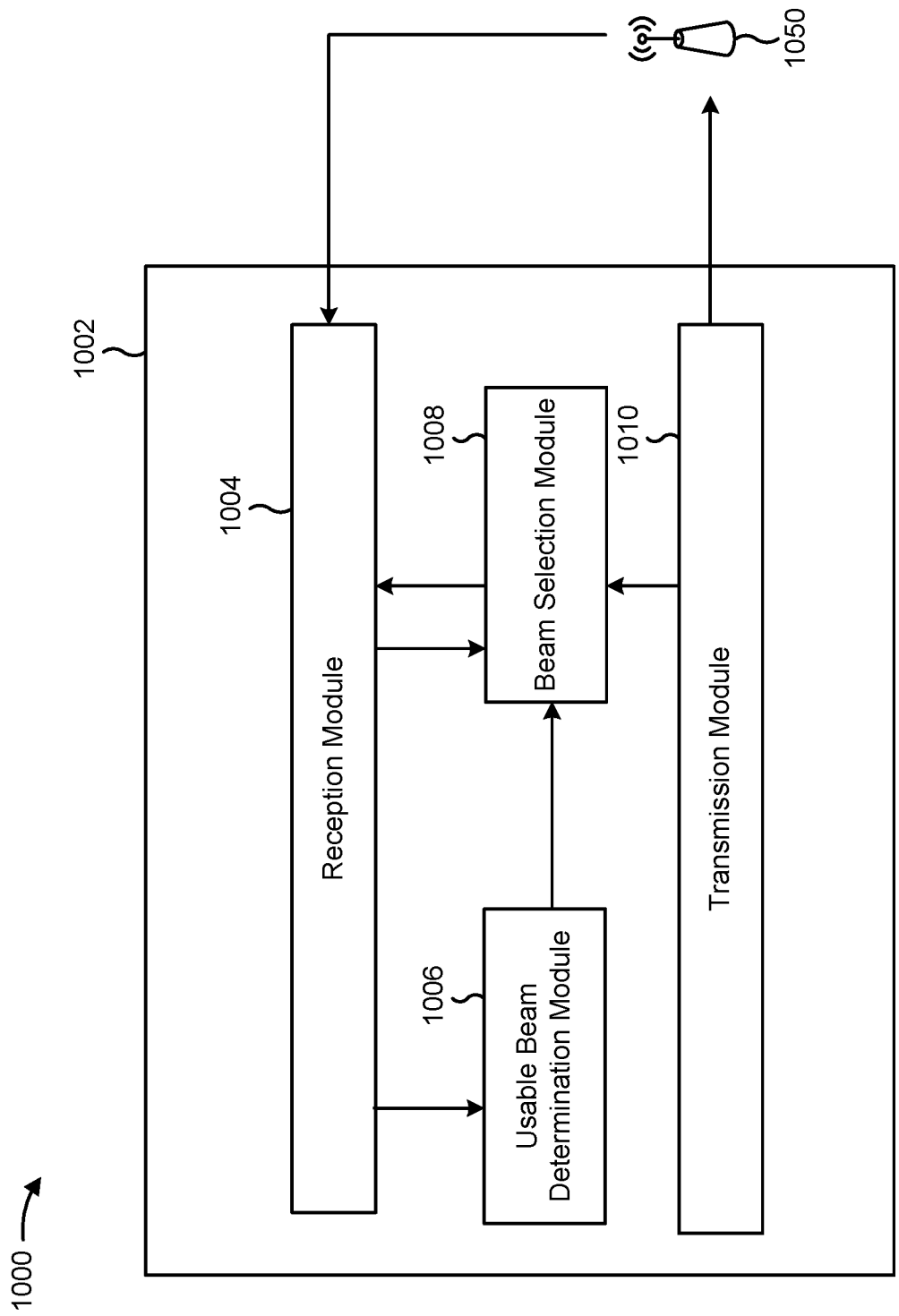
FIG. 10 is a conceptual data flow diagram illustrating an example of a data flow between different modules/means/components in an example apparatus.

FIG. 10 is a conceptual data flow diagram 1000 illustrating the data flow between different modules/means/components in an example apparatus 1002. The apparatus 1002 may be a UE. In some aspects, the apparatus 1002 includes a reception module 1004, a usable beam determination module 1006, a beam selection module 1008, and/or a transmission module 1010.

The reception module 1004 may receive scheduling information from an apparatus 1050 (e.g., a base station) that schedules a PDSCH communication for the apparatus 1002. The usable beam determination module 1006 may determine a set of usable beams and/or a set of unusable beams associated with an uplink beam, such as based at least in part on measurements received from the reception module 1004. The usable beam determination module 1006 may indicate the set of usable beams for different uplink beams to the beam selection module 1008. The beam selection module 1008 may receive, from the reception module 1004, an indication of a slot in which a PDSCH communication is scheduled. Additionally, or alternatively, the beam selection module 1008 may receive, from the reception module 1004 or the transmission module 1010, an indication of an uplink beam to be used in the slot. The beam selection module 1008 may select a downlink beam for reception of the PDSCH communication from the set of usable downlink beams associated with the uplink beam to be used by the apparatus 1002 for uplink transmission in one or more symbols in which the PDSCH communication is scheduled. The beam selection module 1008 may indicate the selected downlink beam to the reception module 1004. The reception module 1004 may use the selected downlink beam for reception of the PDSCH communication.

The apparatus may include additional modules that perform each of the blocks of the algorithm in the aforementioned process 800 of FIG. 8 and/or the like. Each block in the aforementioned process 800 of FIG. 8 and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 10 are provided as an example. In practice, there may be additional modules, fewer modules, different modules, or differently arranged modules than those shown in FIG. 10. Furthermore, two or more modules shown in FIG. 10 may be implemented within a single module, or a single module shown in FIG. 10 may be implemented as multiple, distributed modules. Additionally, or alternatively, a set of modules (e.g., one or more modules) shown in FIG. 10 may perform one or more functions described as being performed by another set of modules shown in FIG. 10.

Figure 11:
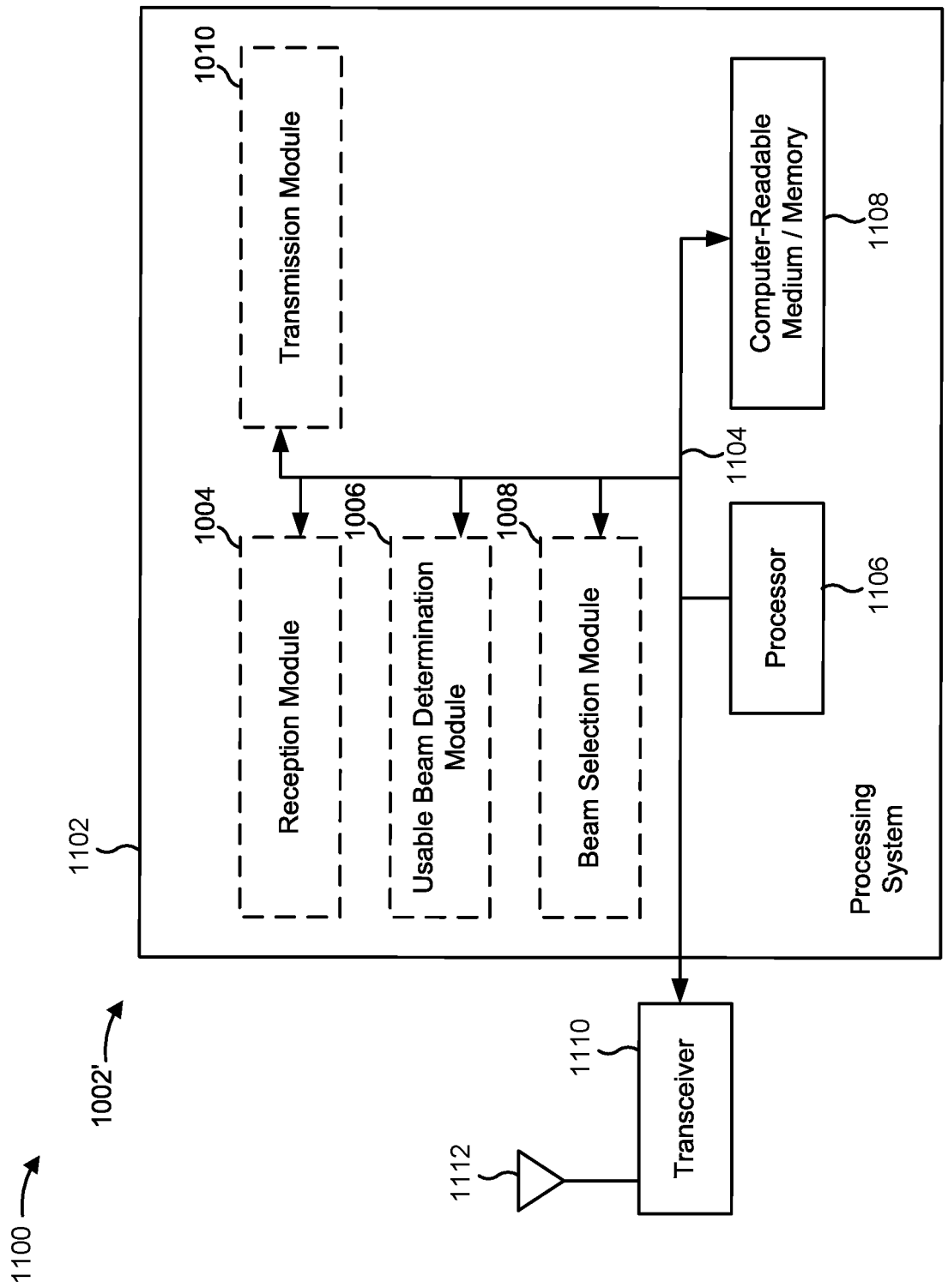
FIG. 11 is a diagram illustrating an example of a hardware implementation for an apparatus employing a processing system.

FIG. 11 is a diagram 1100 illustrating an example of a hardware implementation for an apparatus 1002' employing a processing system 1102. The apparatus 1002' may be a UE.

The processing system 1102 may be implemented with a bus architecture, represented generally by the bus 1104. The bus 1104 may include any number of interconnecting buses and bridges depending on the specific application of the processing system 1102 and the overall design constraints. The bus 1104 links together various circuits including one or more processors and/or hardware modules, represented by the processor 1106, the modules 1004, 1006, 1008, and/or 1010 and the computer-readable medium/memory 1108. The bus 1104 may also link various other circuits such as timing sources, peripherals, voltage regulators, and power management circuits, which are well known in the art, and therefore will not be described any further.

The processing system 1102 may be coupled to a transceiver 1110. The transceiver 1110 is coupled to one or more antennas 1112. The transceiver 1110 provides a means for communicating with various other apparatuses over a transmission medium. The transceiver 1110 receives a signal from the one or more antennas 1112, extracts information from the received signal, and provides the extracted information to the processing system 1102, specifically the reception module 1004. In addition, the transceiver 1110 receives information from the processing system 1102, specifically the transmission module 1010, and based at least in part on the received information, generates a signal to be applied to the one or more antennas 1112. The processing system 1102 includes a processor 1106 coupled to a computer-readable medium/memory 1108. The processor 1106 is responsible for general processing, including the execution of software stored on the computer-readable medium/memory 1108. The software, when executed by the processor 1106, causes the processing system 1102 to perform the various functions described herein for any particular apparatus. The computer-readable medium/memory 1108 may also be used for storing data that is manipulated by the processor 1106 when executing software. The processing system further includes at least one of the modules 1004, 1006, 1008, and/or 1010. The modules may be software modules running in the processor 1106, resident/stored in the computer readable medium/memory 1108, one or more hardware modules coupled to the processor 1106, or some combination thereof. The processing system 1102 may be a component of the UE 120 and may include the memory 282 and/or at least one of the TX MIMO processor 266, the RX processor 258, and/or the controller/processor 280.

In some aspects, the apparatus 1002/1002' for wireless communication includes means for receiving scheduling information that schedules a PDSCH communication for the apparatus 1002/1002'; means for selecting a downlink beam for reception of the PDSCH communication from a set of usable downlink beams associated with an uplink beam to be used by the apparatus 1002/1002' for uplink transmission in one or more symbols in which the PDSCH communication is scheduled; and/or the like. The aforementioned means may be one or more of the aforementioned modules of the apparatus 1002 and/or the processing system 1102 of the apparatus 1002' configured to perform the functions recited by the aforementioned means. As described elsewhere herein, the processing system 1102 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 11 is provided as an example. Other examples may differ from what is described in connection with FIG. 11.

Figure 12:
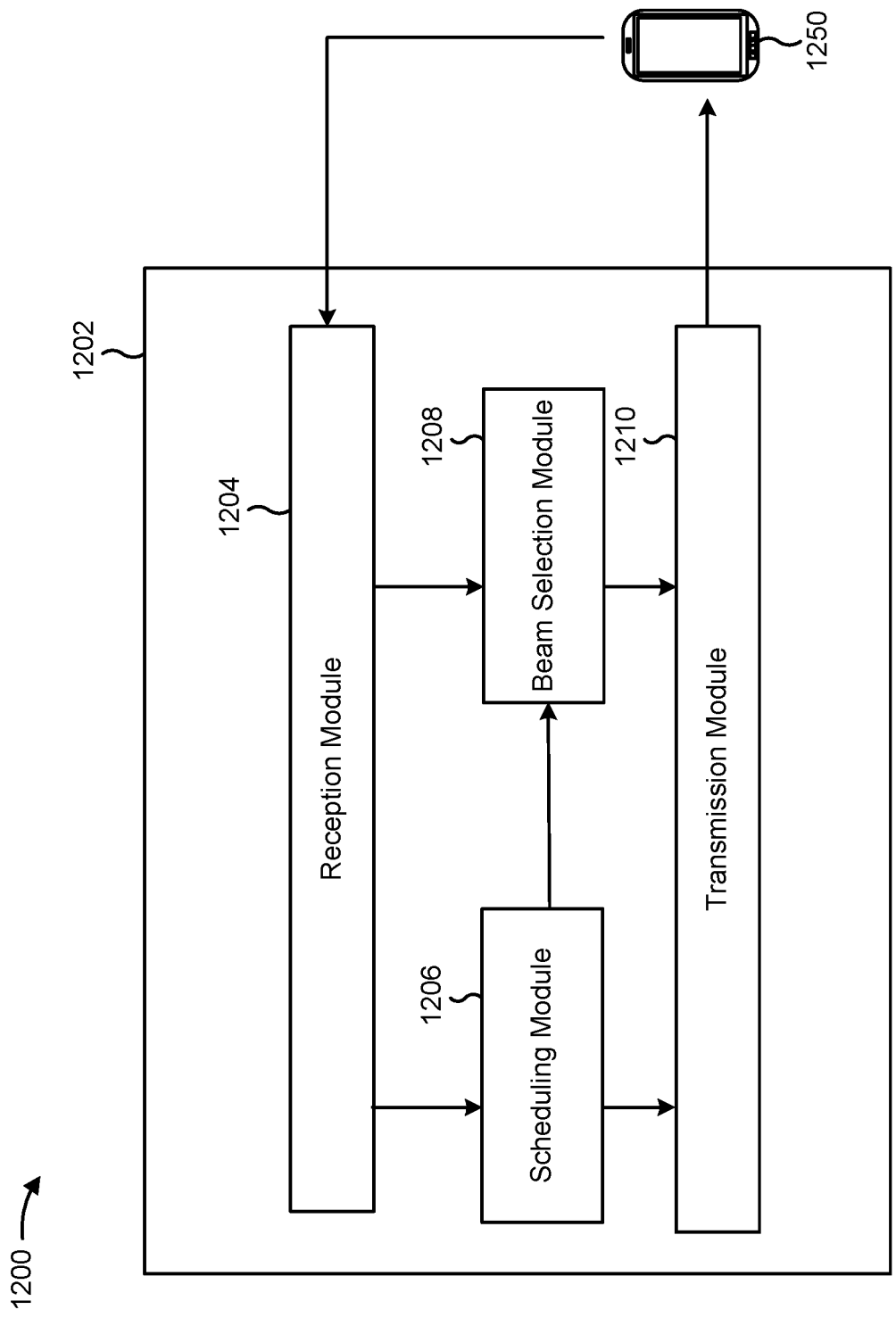
FIG. 12 is a conceptual data flow diagram illustrating an example of a data flow between different modules/means/components in an example apparatus.

FIG. 12 is a conceptual data flow diagram 1200 illustrating the data flow between different modules/means/components in an example apparatus 1202. The apparatus 1202 may be a base station. In some aspects, the apparatus 1202 includes a reception module 1204, a scheduling module 1206, a beam selection module 1208, and/or a transmission module 1210.

The scheduling module 1206 may schedule a PDSCH communication for an apparatus 1250 (e.g., a UE). In some aspects, such scheduling may be based at least in part on information received from the reception module 1204 (e.g., information received from one or more UEs). The scheduling module 1206 may provide scheduling information to the transmission module 1210, such as information for a PDCCH communication (e.g., DCI). The transmission module 1210 may transmit, to the apparatus 1250, the scheduling information that schedules the PDSCH communication for the apparatus 1250. The reception module 1204 may receive, from the apparatus 1250, a report of a set of usable beams and/or a set of unusable beams associated with an uplink beam, such as based at least in part on measurements transmitted by the transmission module 1210. The reception module 1204 may indicate the set of usable beams for different uplink beams to the beam selection module 1208. The beam selection module 1208 may receive, from the scheduling module 1206, an indication of a slot in which a PDSCH communication is scheduled. Additionally, or alternatively, the beam selection module 1208 may receive, from one or more other modules, an indication of an uplink beam to be used by the apparatus 1250 in the slot. The beam selection module 1208 may select a downlink beam for transmission of the PDSCH communication from the set of usable downlink beams associated with the uplink beam to be used by the apparatus 1250 for uplink transmission in one or more symbols in which the PDSCH communication is scheduled. The beam selection module 1208 may indicate the selected downlink beam to the transmission module 1210. The transmission module 1210 may use the selected downlink beam for transmission of the PDSCH communication.

The apparatus may include additional modules that perform each of the blocks of the algorithm in the aforementioned process 900 of FIG. 9 and/or the like. Each block in the aforementioned process 900 of FIG. 9 and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 12 are provided as an example. In practice, there may be additional modules, fewer modules, different modules, or differently arranged modules than those shown in FIG. 12. Furthermore, two or more modules shown in FIG. 12 may be implemented within a single module, or a single module shown in FIG. 12 may be implemented as multiple, distributed modules. Additionally, or alternatively, a set of modules (e.g., one or more modules) shown in FIG. 12 may perform one or more functions described as being performed by another set of modules shown in FIG. 12.

Figure 13:
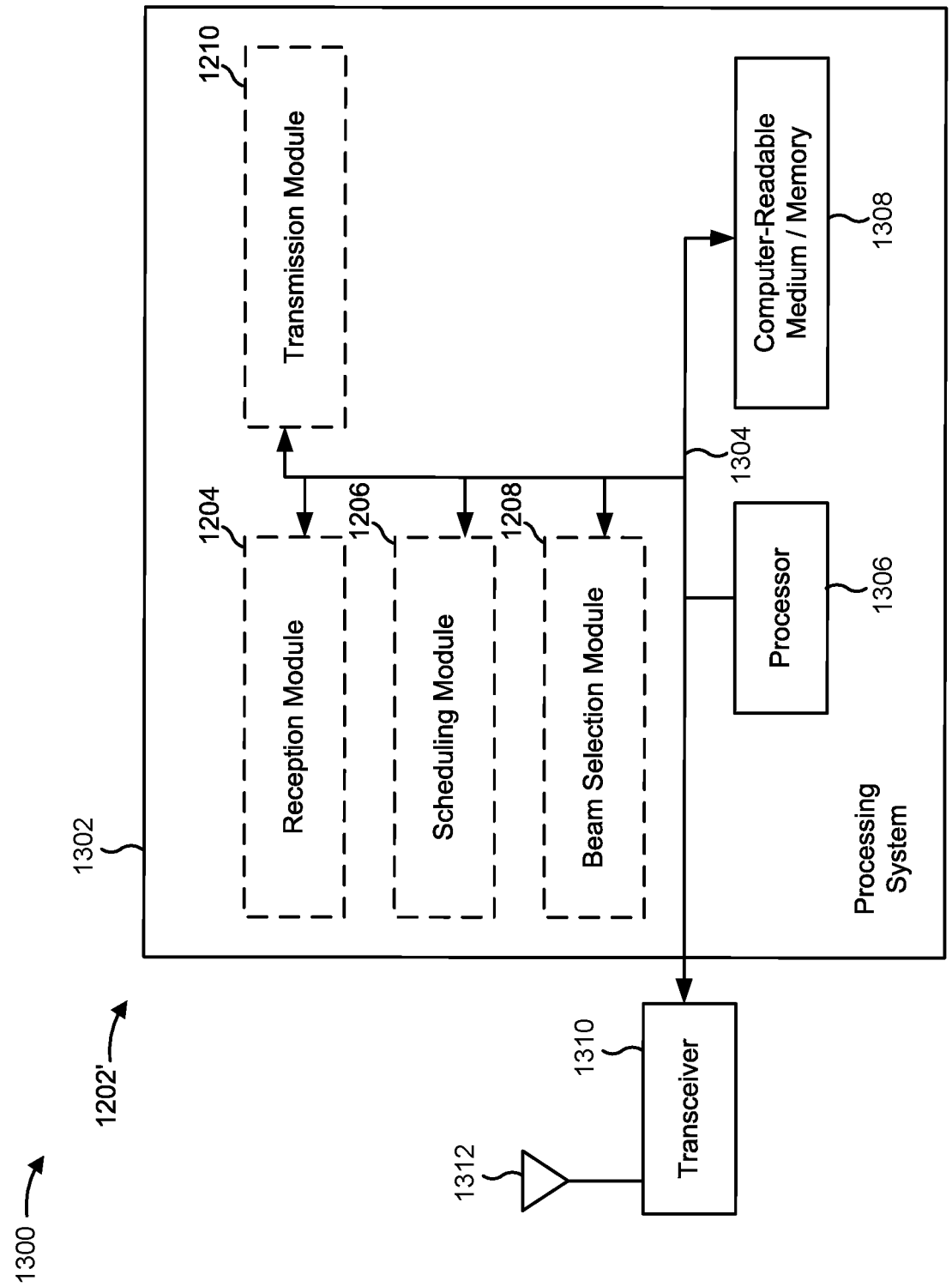
FIG. 13 is a diagram illustrating an example of a hardware implementation for an apparatus employing a processing system.

FIG. 13 is a diagram 1300 illustrating an example of a hardware implementation for an apparatus 1202' employing a processing system 1302. The apparatus 1202' may be a base station.

The processing system 1302 may be implemented with a bus architecture, represented generally by the bus 1304. The bus 1304 may include any number of interconnecting buses and bridges depending on the specific application of the processing system 1302 and the overall design constraints. The bus 1304 links together various circuits including one or more processors and/or hardware modules, represented by the processor 1306, the modules 1204, 1206, 1208, and/or 1210, and the computer-readable medium/memory 1308. The bus 1304 may also link various other circuits such as timing sources, peripherals, voltage regulators, and power management circuits, which are well known in the art, and therefore will not be described any further.

The processing system 1302 may be coupled to a transceiver 1310. The transceiver 1310 is coupled to one or more antennas 1312. The transceiver 1310 provides a means for communicating with various other apparatuses over a transmission medium. The transceiver 1310 receives a signal from the one or more antennas 1312, extracts information from the received signal, and provides the extracted information to the processing system 1302, specifically the reception module 1204. In addition, the transceiver 1310 receives information from the processing system 1302, specifically the transmission module 1210, and based at least in part on the received information, generates a signal to be applied to the one or more antennas 1312. The processing system 1302 includes a processor 1306 coupled to a computer-readable medium/memory 1308. The processor 1306 is responsible for general processing, including the execution of software stored on the computer-readable medium/memory 1308. The software, when executed by the processor 1306, causes the processing system 1302 to perform the various functions described herein for any particular apparatus. The computer-readable medium/memory 1308 may also be used for storing data that is manipulated by the processor 1306 when executing software. The processing system further includes at least one of the modules 1204, 1206, 1208, and/or 1210. The modules may be software modules running in the processor 1306, resident/stored in the computer readable medium/memory 1308, one or more hardware modules coupled to the processor 1306, or some combination thereof. The processing system 1302 may be a component of the base station 110 and may include the memory 242 and/or at least one of the TX MIMO processor 230, the RX processor 238, and/or the controller/processor 240.

In some aspects, the apparatus 1202/1202' for wireless communication includes means for transmitting scheduling information that schedules a PDSCH communication for a UE; means for selecting a downlink beam for transmission of the PDSCH communication from a set of usable downlink beams associated with an uplink beam to be used by the UE for uplink transmission in one or more symbols in which the PDSCH communication is scheduled; and/or the like. The aforementioned means may be one or more of the aforementioned modules of the apparatus 1202 and/or the processing system 1302 of the apparatus 1202' configured to perform the functions recited by the aforementioned means. As described elsewhere herein, the processing system 1302 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 13 is provided as an example. Other examples may differ from what is described in connection with FIG. 13.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a physical downlink control channel (PDCCH) communication including scheduling information that schedules a physical downlink shared channel (PDSCH) communication for the UE, wherein the PDSCH communication is scheduled in a same slot as an uplink communication to be used by the UE such that the UE operates in full-duplex mode in the same slot;
   determining a set of usable downlink beams associated with an uplink beam to be used by the UE for uplink transmission based at least in part on self-interference associated with full duplex communication performed by the UE in the same slot; and
   selecting a downlink beam, for reception of the PDSCH communication and from the set of usable downlink beams, based at least in part on identifying the uplink communication.

2. The method of claim 1, wherein the uplink beam is further associated with a set of unusable downlink beams.

3. The method of claim 1, wherein the downlink beam corresponds to a Type D quasi co-location relationship.

4. The method of claim 1, wherein the uplink beam corresponds to a sounding reference signal resource.

5. The method of claim 1, further comprising:
   determining that a length of time from the PDCCH communication to the PDSCH communication satisfies a threshold; and
   determining whether a downlink beam of the PDCCH communication that schedules the PDSCH communication is a usable downlink beam, of the set of usable downlink beams, based at least in part on determining that the length of time satisfies the threshold,
   wherein selecting the downlink beam for reception of the PDSCH communication is based at least in part on determining that the length of time satisfies the threshold and determining whether the downlink beam of the PDCCH communication that schedules the PDSCH communication is the usable downlink beam.

6. The method of claim 5, wherein selecting the downlink beam for reception of the PDSCH communication comprises:
   selecting the downlink beam of the PDCCH communication that schedules the PDSCH communication if the downlink beam of the PDCCH communication that schedules the PDSCH communication is the usable downlink beam, or
   selecting the usable downlink beam with a lowest downlink beam identifier among a set of downlink beams associated with the UE if the downlink beam of the PDCCH communication that schedules the PDSCH communication is an unusable downlink beam.

7. The method of claim 6, wherein the set of downlink beams associated with the UE is one of a set of activated downlink beams for the UE or a set of configured downlink beams for the UE.

8. The method of claim 6, wherein the downlink beam identifier is a transmission configuration indication state identifier.

9. The method of claim 5, wherein the PDCCH communication does not indicate a downlink beam to be used for the PDSCH communication.

10. The method of claim 5, wherein the PDCCH communication indicates the downlink beam to be used for the PDSCH communication, and wherein an amount of time for the UE to switch to the downlink beam for the PDSCH communication is less than a minimum PDCCH decoding time that is supported by the UE.

11. The method of claim 5, wherein the threshold is a beam switching timing threshold supported by the UE.

12. The method of claim 1, further comprising:
  determining that a length of time from the PDCCH communication that schedules the PDSCH communication to the PDSCH communication does not satisfy a threshold; and
  determining whether a downlink beam, of a control resource set (CORESET) having a lowest CORESET identifier among all CORESETs monitored by the UE in an active bandwidth part in a last slot, before the PDSCH communication, that includes a CORESET for the UE, is a usable downlink beam, of the set of useable downlink beams, based at least in part on determining that the length of time does not satisfy the threshold,
    wherein selecting the downlink beam for reception of the PDSCH communication is based at least in part on determining that the length of time does not satisfy the threshold and determining whether the downlink beam of the CORESET having the lowest CORESET identifier is the usable downlink beam.

13. The method of claim 12, wherein selecting the downlink beam for reception of the PDSCH communication comprises:
  selecting the downlink beam of the CORESET having the lowest CORESET identifier among all CORESETs monitored by the UE in the active bandwidth part in the last slot if the downlink beam of the CORESET having the lowest CORESET identifier among all CORESETs monitored by the UE in the active bandwidth part in the last slot is the usable downlink beam,
  selecting a usable downlink beam of a CORESET having a lowest CORESET identifier among a set of CORESETs, for which a corresponding downlink beam is the usable downlink beam, monitored by the UE in the active bandwidth part in the last slot if at least one CORESET monitored by the UE in the active bandwidth part in the last slot is associated with the usable downlink beam, or
  selecting a usable downlink beam with a lowest downlink beam identifier among a set of downlink beams associated with the UE if none of the CORESETs monitored by the UE in the active bandwidth part in the last slot is associated with the usable downlink beam.

14. The method of claim 13, wherein the set of downlink beams associated with the UE is one of a set of activated downlink beams for the UE or a set of configured downlink beams for the UE.

15. The method of claim 13, wherein the downlink beam identifier is a transmission configuration indication state identifier.

16. The method of claim 12, wherein the threshold is a beam switching timing threshold supported by the UE.

17. The method of claim 1, further comprising:
  determining that a length of time from the PDCCH communication, that schedules the PDSCH communication, to the PDSCH communication does not satisfy a threshold; and
  determining whether at least one control resource set (CORESET), monitored by the UE in an active bandwidth part in a last slot, before the PDSCH communication, that includes a CORESET for the UE, is associated with a usable downlink beam of the set of usable downlink beams,
    wherein selecting the downlink beam for reception of the PDSCH communication is based at least in part on determining that the length of time does not satisfy the threshold and determining whether at least one CORESET monitored, by the UE in the active bandwidth part in the last slot, is associated with the usable downlink beam.

18. The method of claim 17, wherein selecting the downlink beam for reception of the PDSCH communication comprises:
  selecting the usable downlink beam of a CORESET having a lowest CORESET identifier among a set of CORESETs, for which a corresponding downlink beam is the usable downlink beam, monitored by the UE in the active bandwidth part in the last slot if at least one CORESET, monitored by the UE in the active bandwidth part in the last slot, is associated with the usable downlink beam, or
  selecting the usable downlink beam with a lowest downlink beam identifier among a set of downlink beams associated with the UE if none of the CORESETs monitored by the UE in the active bandwidth part in the last slot is associated with the usable downlink beam.

19. The method of claim 18, wherein the set of downlink beams associated with the UE is one of a set of activated downlink beams for the UE or a set of configured downlink beams for the UE.

20. The method of claim 18, wherein the downlink beam identifier is a transmission configuration indication state identifier.

21. The method of claim 17, wherein the threshold is a beam switching timing threshold supported by the UE.

22. A method of wireless communication performed by a network entity, comprising:
  transmitting a physical downlink control channel (PDCCH) communication including scheduling information that schedules a physical downlink shared channel (PDSCH) communication for a user equipment (UE), wherein the PDSCH communication is scheduled in a same slot as an uplink communication to be used by the UE such that the UE operates in full-duplex mode in the same slot; and
  selecting a downlink beam, for transmission of the PDSCH communication and from a set of usable downlink beams associated with an uplink beam to be used by the UE for uplink transmission, based at least in part on identifying the uplink communication,
    wherein the set of usable downlink beams is based at least in part on self-interference associated with full duplex communication performed by the UE in the same slot.

23. The method of claim 22, wherein the set of usable downlink beams is indicated to the network entity by the UE.

24. The method of claim 22, wherein the uplink beam is further associated with a set of unusable downlink beams.

25. The method of claim 22, wherein the downlink beam corresponds to a Type D quasi co-location relationship.

26. The method of claim 22, wherein the uplink beam corresponds to a sounding reference signal resource.

27. A user equipment (UE) for wireless communication, comprising:
  a memory; and
  one or more processors coupled to the memory, the one or more processors configured to:
    receive a physical downlink control channel (PDCCH) communication including scheduling information that schedules a physical downlink shared channel (PDSCH) communication for the UE, wherein the PDSCH communication is scheduled in a same slot as an uplink communication to be used by the UE, in a same slot such that the UE operates in full-duplex mode in the same slot;
determine a set of usable downlink beams associated with an uplink beam to be used by the UE for uplink transmission based at least in part on self-interference associated with full duplex communication performed by the UE in the same slot; and
select a downlink beam, for reception of the PDSCH communication and from the set of usable downlink beams, based at least in part on identifying the uplink communication.

28. A network entity for wireless communication, comprising:
a memory; and
one or more processors coupled to the memory, the one or more processors configured to:
transmit a physical downlink control channel (PDCCH) communication including scheduling information that schedules a physical downlink shared channel (PDSCH) communication for a user equipment (UE), wherein the PDSCH communication is scheduled in a same slot as an uplink communication to be used by the UE, such that the UE operates in full-duplex mode in the same slot; and
select a downlink beam, for transmission of the PDSCH communication and from a set of usable downlink beams associated with an uplink beam to be used by the UE for uplink transmission, based at least in part on identifying the uplink communication,
wherein the set of usable downlink beams is based at least in part on self-interference associated with full duplex communication performed by the UE in the same slot.

29. The UE of claim 27, wherein the uplink beam is further associated with a set of unusable downlink beams.

30. The UE of claim 27, wherein the downlink beam corresponds to a Type D quasi co-location relationship.

* * * * *